United States Patent
Koenig et al.

(10) Patent No.: US 9,987,830 B2
(45) Date of Patent: Jun. 5, 2018

(54) METHOD FOR PROCESSING A CARRIER AND METHOD FOR TRANSFERRING A GRAPHENE LAYER

(71) Applicant: Infineon Technologies AG, Neubiberg (DE)

(72) Inventors: Matthias Koenig, Regensburg (DE); Guenther Ruhl, Regensburg (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 476 days.

(21) Appl. No.: 14/828,557

(22) Filed: Aug. 18, 2015

(65) Prior Publication Data

US 2017/0050422 A1     Feb. 23, 2017

(51) Int. Cl.
| | | |
|---|---|---|
| C01B 31/02 | (2006.01) | |
| B32B 37/02 | (2006.01) | |
| B32B 38/10 | (2006.01) | |
| B32B 37/00 | (2006.01) | |
| B05D 1/32 | (2006.01) | |
| C01B 32/194 | (2017.01) | |

(52) U.S. Cl.
CPC ............ B32B 37/025 (2013.01); B05D 1/322 (2013.01); B32B 38/10 (2013.01); C01B 32/194 (2017.08); *B32B 2307/202* (2013.01); *B32B 2313/04* (2013.01); *B32B 2457/00* (2013.01)

(58) Field of Classification Search
None
See application file for complete search history.

(56) References Cited

U.S. PATENT DOCUMENTS

| | | | | |
|---|---|---|---|---|
| 2010/0200538 A1* | 8/2010 | Petisce | ................ | A61B 5/0006 216/13 |
| 2012/0128983 A1* | 5/2012 | Yoon | ...................... | B82Y 30/00 428/408 |

OTHER PUBLICATIONS https://web.archive.org/web/20140625063948/http://www.nature.com/subjects/two-dimensional-materials (Year: 2014).*
Gao et al., "Face-to-face transfer of wafer-scale graphene films", Nature, 00/2013, vol. 000, Macmillan Publishers Limited, pp. 1-5.
Gorantla et al., "A universal transfer route for graphene", Nanoscale, 2014, 6, pp. 889-896.

* cited by examiner

*Primary Examiner* — Barbara J Musser
(74) *Attorney, Agent, or Firm* — Viering, Jentschura & Partner mbB

(57) ABSTRACT

According to various embodiments, a method for processing a carrier may include: forming a layer structure over the carrier, the layer structure including a support layer and a two-dimensional layer over the support layer; wherein the layer structure has at least one opening that exposes a portion of the carrier; forming an auxiliary layer structure, wherein the auxiliary layer structure at least partially covers the layer structure and at least partially fills the at least one opening; and removing the support layer of the layer structure.

20 Claims, 11 Drawing Sheets

METHOD FOR PROCESSING A CARRIER AND METHOD FOR TRANSFERRING A GRAPHENE LAYER

TECHNICAL FIELD

Various embodiments relate generally to a method for processing a carrier and a method for transferring a graphene layer.

BACKGROUND

In general, forming a very thin layer of a material, e.g. with a thickness in the nanometer range or with a thickness even smaller than one nanometer, may be very challenging using typical processes of semiconductor industry. However, so-called two dimensional materials may be highly attractive for electronic devices and integrated circuit technologies. Graphene for example, including a layer of carbon atoms in a hexagonal arrangement, may have superior electronic properties enabling, for example, the manufacturing of a transistor having an increased response and/or switching behavior. Further, an ultrathin layer of a material may have enhanced properties compared to the corresponding bulk material. Therefore, two-dimensional materials could be important for microelectronics, e.g. for developing various types of sensors, transistors, and the like, wherein the challenging task may be incorporating these two-dimensional materials into a microchip for emulating the common silicon technology.

SUMMARY

According to various embodiments, a method for processing a carrier may include: forming a layer structure over the carrier, the layer structure including a support layer and a two-dimensional layer over the support layer; wherein the layer structure has at least one opening that exposes a portion of the carrier; forming an auxiliary layer structure, wherein the auxiliary layer structure at least partially covers the layer structure and at least partially fills the at least one opening; and removing the support layer of the layer structure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
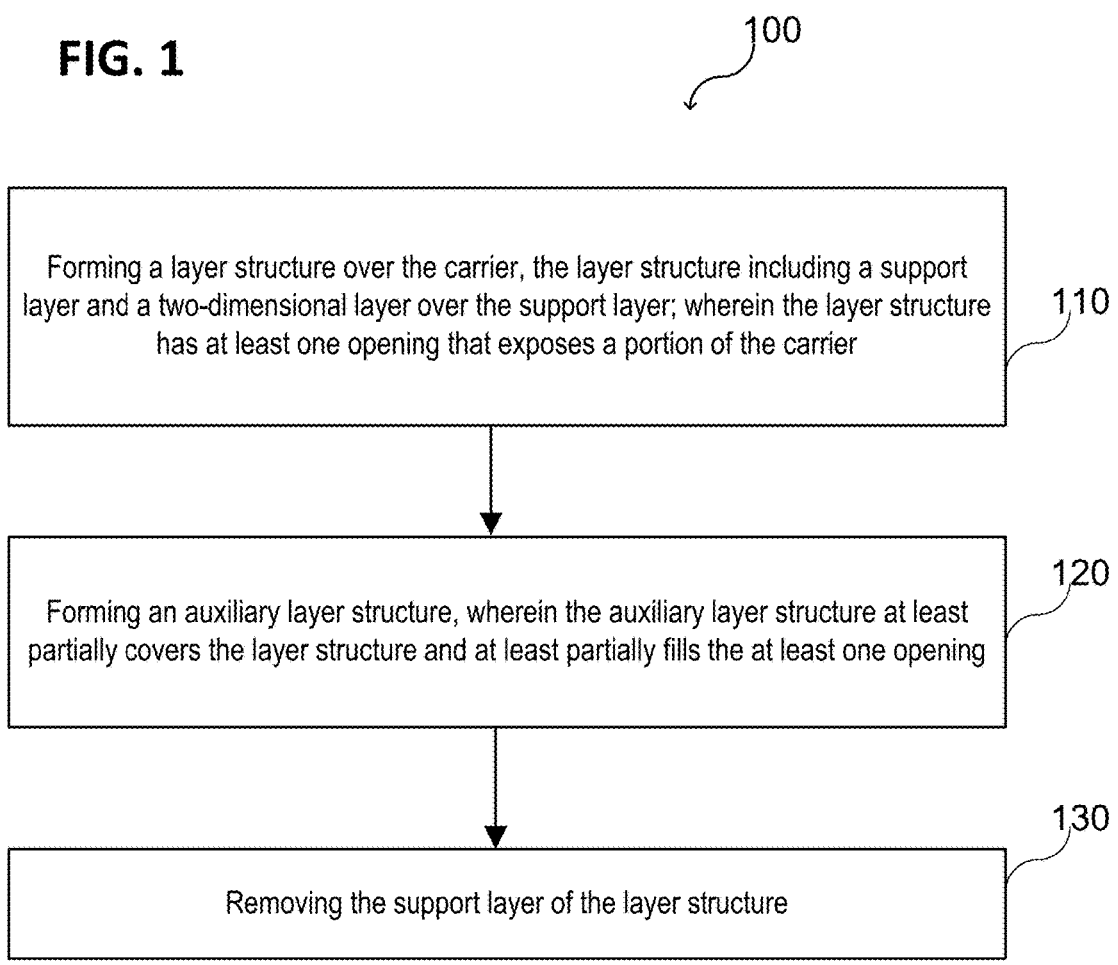
FIG. 1 shows a schematic flow diagram of a method for processing a carrier, according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The term "lateral" used with regards to the "lateral" extension of a structure (or of a structure element) provided at least one of on or in a carrier or "laterally" next to, may be used herein to mean an extension or a positional relationship along a surface of the carrier. That means that a surface of a carrier (e.g. a surface of a substrate, a surface of a wafer, or a surface of a semiconductor work piece) may serve as reference, commonly referred to as the main processing surface. Further, the term "width" used with regards to a "width" of a structure (or of a structure element) may be used herein to mean the lateral extension of a structure. Further, the term "height" used with regards to a height of a structure (or of a structure element), may be used herein to mean an extension of a structure along a direction perpendicular to the surface of a carrier (e.g. perpendicular to the main processing surface of a carrier). The term "thickness" used with regards to a "thickness" of a layer may be used herein to mean the spatial extension of the layer perpendicular to the surface of the support (e.g. the surface of the layer or structure) on which the layer is deposited. If a surface of the support is parallel to the surface of the carrier (e.g. parallel to the main processing surface) the "thickness" of the layer deposited on the surface of the support may be the same as the height of the layer. Further, a "vertical" structure may be referred to as a structure extending in a direction perpendicular to the lateral direction (e.g. perpendicular to the main processing surface of a carrier) and a "vertical" extension may be referred to as an extension along a direction perpendicular to the lateral direction (e.g. an extension perpendicular to the main processing surface of a carrier).

According to various embodiments, a carrier (e.g. a layer, a substrate, a wafer, a work piece, etc.) may include semiconductor materials of various types, including, for example, silicon, germanium, Group III to V or other types, including polymers, for example, although in another embodiment, other suitable materials can also be used. In an embodiment, the carrier includes silicon (e.g. doped or undoped), in an alternative embodiment, the carrier includes a silicon on insulator (SOI) wafer. As an alternative, any other suitable semiconductor materials can be used for the carrier, for example semiconductor compound material such as gallium arsenide (GaAs), indium phosphide (InP), but also any suitable ternary semiconductor compound material or quaternary semiconductor compound material such as indium gallium arsenide (InGaAs). According to various embodiments, the carrier may include a thin or an ultrathin substrate or wafer, e.g. with a thickness in the range from about several micrometers to about several tens of micrometers, e.g. in the range from about 5 µm to about 50 µm, e.g. with a thickness less than about 100 µm or less than about 50 µm. Further, the carrier may include a silicon wafer with a thickness of about 750 µm or less than about 750 µm. According to various embodiments, a carrier may include SiC (silicon carbide) or may be a silicon carbide carrier, a silicon carbide substrate, a silicon carbide wafer, or a silicon carbide work piece. According to various embodiments, a carrier may include $SiO_2$ (silicon oxide) or may be a silicon oxide carrier, a silicon oxide substrate, a silicon oxide wafer, or a silicon oxide work piece. Further, a carrier may include an electrically isolating material (in other words a dielectric material or an electrically insulating material) at a surface region of the carrier or the carrier may consist of an electrically isolating material so that an electrically conductive layer, e.g. a graphene layer, may be formed and functionalized at the dielectric surface of the carrier.

In general, the physical and chemical properties of a material may not be defined exclusively by its crystal structure and chemical composition. Since the physical properties, for example the electronic properties (e.g. the band structure), of a surface of a material may differ from the physical properties of the bulk material, there may be a difference regarding the physical properties of a layer or region, if at least one spatial extension of the layer or region is reduced to the nanometer range or even sub-nanometer range. In this case, the surface properties of the respective material forming the layer or region may dominate the characteristics (e.g. physical and chemical properties) of the layer or the region. In the limiting case, at least one dimension of a layer or region may have a spatial extension of several angstroms, which may be the spatial extension of exactly one monolayer of atoms of the respective material. A monolayer may be a layer having a lateral extension and a layer thickness (or height) perpendicular to the lateral extension, the layer including a plurality of atoms (or molecules), wherein the layer has a thickness (or height) of one single atom (or molecule). In other words, a monolayer of a material may not have equal atoms (or molecules) being arranged above each other (along the thickness or height direction).

According to various embodiments, there may be several different materials intrinsically forming monolayers, so-called self-assembled monolayers, which may be referred to as two-dimensional materials, or more precisely as structural two-dimensional materials. Further, a typical representative of such a structural two-dimensional material may be graphene, consisting of a hexagonal two-dimensional arrangement of carbon atoms, a so-called honey-comb structure.

According to various embodiments, graphene may be also referred to as a graphene sheet or a graphene layer. A further representative of a two-dimensional material may be hydrogenated graphene (graphane), or partially hydrogenated graphene. In pure graphene sheets, the structural arrangement and the bindings of the carbon atoms may be described using hybridization (hybrid atomic orbitals), wherein in this case the carbon atoms are $sp^2$-hybrids, which means that a covalent bonding of the carbon atoms forms a hexagonal two-dimensional layer, i.e. a hexagonal monolayer. In hydrogenated graphene or graphane, the carbon atoms may be $sp^3$-hybrids or a mixture of $sp^2$-hybrids and $sp^3$-hybrids, wherein the carbon atoms being $sp^3$-hybrids are connected to a hydrogen atom, forming a sheet like (two-dimensional) structure.

A two-dimensional material, as referred to herein, may be a layer having covalent bonding along two spatial directions forming a sheet structure or a two-dimensional structure, e.g. self-assembled, wherein the two-dimensional material may not have a covalent bonding to other atoms outside the sheet structure. A two-dimensional material, as referred to herein, may be a layer consisting of a monolayer of a material. A two-dimensional material, as referred to herein, may be a layer consisting of a bilayer of a material. According to various embodiments, a graphene layer may include carbon in a two-dimensional structure, e.g. in a hexagonally arranged lattice.

Typical three-dimensional materials, e.g. metal bulk material, may have different physical and chemical properties, depending on the lateral extension of the material, e.g. a monolayer or an ultra-thin layer of a material may have different properties than a bulk of the same material. A monolayer or an ultra-thin layer of a three-dimensional material may have different properties than a thicker layer of the material, since the volume to surface ratio is changing. Therefore the properties of a thin layer of a material may approach the bulk properties of the material with increasing layer thickness.

In contrast, a layer including a two-dimensional material, e.g. graphene, graphane, silicene, germanene, may retain its physical and chemical properties independently from the layer thickness, e.g. a monolayer of a two-dimensional material may have substantially the same properties as a plurality of monolayers arranged above each other, since the individual layers may not be substantially coupled to each other, e.g. since there may be no covalent, ionic, and/or metallic bonding between the individual layers of a two-dimensional material. According to various embodiments, a plurality of graphene layers or sheets stacked above each other may be weakly coupled with each other (e.g. via van der Waals interaction).

A two-dimensional material, as described herein, may exhibit unique physical and/or chemical properties. Graphene, for example, may be a semiconductor (e.g. a zero-gap semiconductor), or a semi-metal having a very high charge carrier mobility (e.g. in the range from about 40,000 to about 200,000 $cm^2/Vs$ on an electrically insulating substrate). Further, graphene may have other unique properties (electrical, mechanical, magnetic, thermal, optical, and the like), making graphene interesting for electronic industry (e.g. for the use in sensors (gas sensors, magnetic sensors), as electrodes, in transistors, as quantum dots, and the like). However, graphene, as well as other promising structural two-dimensional materials, may include one or more sheets or monolayers (e.g. a graphene monolayer, e.g. a graphene bilayer, e.g. a graphene multilayer) disposed on an electrically insulating substrate, e.g. on silicon dioxide.

According to various embodiments, a method for processing a carrier may be provided, which may be used for forming a two-dimensional layer on an arbitrary carrier, e.g. on a dielectric carrier, as for example on a dielectric layer or a dielectric wafer. The method for processing a carrier may be used for transferring a monolayer of a material, e.g. a graphene monolayer or a graphene sheet. The method for processing a carrier may be used for transferring a bilayer of a material, e.g. a graphene bilayer. The method for processing a carrier may be used for transferring a layer stack including a plurality of graphene sheets. The method for processing a carrier may be used for forming a layer including a two-dimensional material, e.g. graphene, over a surface of a dielectric layer or wafer. The method for processing a carrier, as described herein, may allow the processing of large areas (e.g. greater than 1 mm$^2$) and/or processing of structured (patterned) substrates. In other words, the method for processing a carrier, as described herein, may allow transferring of a layer including a two-dimensional material (or, in other words, transferring a two-dimensional material layer) having a large lateral extension and/or covering a large area of a carrier. Further, the method for processing a carrier, as described herein, may reduce or may prevent the formation of foldings and/or wrinkles in a two-dimensional material provided over the carrier. Further, the method for processing a carrier, as described herein, may be adapted to manufacture other structural two-dimensional layers, e.g. silicene layers, germanene layers, and the like.

According to various embodiments, a two-dimensional material, e.g. one or more graphene sheets, may be formed by catalytic segregation from a carbon containing metal, e.g. nickel (Ni), or by a chemical vapor deposition (CVD) process on a catalytic material surface, e.g. on a metal surface (as for example on a copper surface), or on a metalloid surface (as for example on a germanium surface). Various implementations of a two-dimensional material layer in an electronic device (e.g. in a transistor, a sensor, etc.) may require that the two-dimensional material layer may be disposed over (e.g. directly on) an electrically insulating carrier. According to various embodiments, a method may be provided for transferring a two-dimensional material layer from a surface of a catalytic layer (e.g. for transferring a graphene layer from a surface of a copper layer) to a surface of a dielectric layer. The dielectric layer may be disposed below the catalytic layer or, in other words, the catalytic layer may be disposed over (e.g. directly on) the dielectric layer.

According to various embodiments, as described herein, a catalytic layer may include or may consist of a catalytic material, e.g. of a catalytic metal, as for example copper or nickel. A metal, as referred to herein, may also include or may be also understood as metalloid or metal alloy. Various metals (e.g. nickel, cobalt, tungsten, iridium, platinum) may form a solid solution (also referred to as solid-state solution) with carbon. Illustratively, a metal may act as a solvent for carbon (or other small atoms, as for example, nitrogen), wherein carbon is the solute. In this case the metal may not chemically react with the carbon (or may not form a chemical compound), but rather the carbon atoms may be small enough to be incorporated at interstitials of the metal (in other words of the metal lattice), hence, the metal may be a catalytic metal which allows a segregation of carbon dissolved in the metal. Further, a metal layer (e.g. a catalytic metal or any other type of catalytic material) may be used as seed layer for growing a two-dimensional material layer over the seed layer, e.g. using chemical vapor deposition (CVD) or physical vapor deposition (PVD).

Further, a two-dimensional layer may include or may consist of a two-dimensional material, e.g. of one or more graphene sheets or of one or more monolayers of any other type of two-dimensional material. Further, a dielectric layer may include or may consist of a dielectric (or in other words electrically insulating) material, e.g. of one or more graphene sheets or of one or more monolayers of any other type of two-dimensional material.

According to various embodiments, a method may be provided for removing a catalytic material (e.g. copper) that may be disposed below the two-dimensional material layer (e.g. the graphene layer), wherein the two-dimensional material layer may be laid down on an arbitrary carrier (e.g. on a dielectric carrier) disposed below the catalytic material.

Conventionally, a graphene layer may be transferred from a copper layer to a target substrate by using a supporting plastic film. Therefore, a polymethylmethacrylate (PMMA) film may be deposited over the graphene layer and the copper below the graphene layer may be etched away completely by a wet etchant. In this case, the PMMA/graphene layer stack swims in the wet etchant and has to be captured by the target substrate. This process may not be process compatible with conventionally applied semiconductor mass processing, since the relation of the graphene layer to its carrier is lost during processing.

For manufacturing a high quality graphene layer, a face to face (F2F) transfer of the graphene layer may be used. In this case, a copper layer is formed on a dielectric carrier and a graphene layer is formed on the copper layer; and, subsequently, the copper layer is removed completely, wherein the graphene layer is captured by the dielectric carrier.

According to various embodiments, a face to face transfer may be provided, wherein a graphene layer is transferred to a surface of a dielectric carrier by removing at least one layer that is disposed between the dielectric carrier and the graphene layer, wherein the graphene layer is held in a fixed position relatively to the dielectric carrier while the at least one layer is removed. According to various embodiments, this process may allow to provide a graphene layer on a dielectric carrier, wherein the graphene layer has significantly fewer defects, since the graphene layer is, for example, not subjected to a substantial mechanical stress. Furthermore, this process can be automated easily.

Conventionally used transfer processes for graphene layers, e.g. face to face transfer processes, may be limited in the thickness of the layer or layer stack that is disposed between the dielectric carrier and the graphene layer, e.g. thickness of the copper layer may be limited to less than about 1 μm, e.g. to about 0.5 μm, since the graphene layer is captured to the dielectric carrier due to capillary forces. Further, to provide these capillary forces in conventionally used transfer processes, nitrogen may be implanted into the dielectric carrier, so that the temperature budget during processing is limited due to the nitrogen implant. Illustratively, the nitrogen may easily diffuse out of the dielectric carrier.

According to various embodiments, a transfer process for transferring a graphene layer may be provided, wherein the copper layer (or any other support layer disposed below the graphene layer), on which the graphene layer is formed, may have a thickness greater than about 0.5 μm, 1 μm, or 2 μm, so that the graphene layer can be formed with a low defect density. Further, the thickness of the copper layer (or another support layer) may influence the lateral etching rate and, therefore, the time that is required to remove the copper layer may depend on the respective thickness of the copper layer. Compared to a thinner copper layer, a thicker copper layer (e.g. having a thickness greater than about 0.5 µm, 1 µm, or 2 µm) can be removed easily since the lateral etching rate is increased due to an improved etchant exchange. Further, after or during removing the copper layer, a cleaning process may be carried out to remove metal contaminations from the surface of the graphene layer that faces the carrier. Further, no ion implantation into the dielectric carrier may be necessary, since a transfer structure may be provided that fixes the graphene layer to the dielectric carrier during processing, e.g. during removing the copper layer. It was recognized, that holes may be introduced into a copper layer during processing, if the copper layer is for example thinner than about 500 nm, e.g. if the copper layer has a thickness in the range from about 100 nm to about 500 nm, and, therefore, holes may be also introduced into a graphene layer that is formed on the copper layer. The holes in the copper layer may be caused by evaporation of the copper and/or by stress migration in the copper during processing, e.g. during a temperature treatment.

According to various embodiments, polymer bridges may be utilized to fix a graphene layer to a dielectric carrier during processing, wherein the polymer bridges may be removed after or during transferring the graphene layer to a surface of the dielectric carrier. According to various embodiments, the polymer layer (or any other suitable auxiliary layer or auxiliary layer structure) that is utilized to fix the graphene layer to the dielectric carrier may include portions (also referred to as pillars) that extend through the graphene layer, so that the polymer layer is connected to the carrier by these portions. According to various embodiments, the pillars may have a spacing (e.g. the distance to the respectively next neighbor) in the range from about 10 µm to about 10 mm. According to various embodiments, the pillars may have a diameter or a lateral extension in the range from about 0.1 µm to about 10 µm, e.g. in the range from about 1 µm to about 5 µm.

FIG. 1 illustrates a schematic flow diagram of a method 100 for processing a carrier, according to various embodiments. The method 100 may include: in 110, forming a layer structure over the carrier, the layer structure including a support layer and a two-dimensional layer over the support layer; wherein the layer structure has at least one opening that exposes a portion of the carrier; in 120, forming an auxiliary layer structure, wherein the auxiliary layer structure at least partially covers the layer structure and at least partially fills the at least one opening; and, in 130, removing the support layer of the layer structure. According to various embodiments, the auxiliary layer structure may be a transfer layer structure that is used to bring the two-dimensional layer in contact with the carrier. According to various embodiments, the two-dimensional layer may include at least one graphene monolayer. According to various embodiments, the two-dimensional layer may include a stack of two or more graphene monolayers. According to various embodiments, the support layer may include copper or any other type of suitable catalytic material for forming (e.g. depositing or segregating) the two-dimensional layer. According to various embodiments, the carrier may include a layer, a wafer or any other suitable type of a carrier. According to various embodiments, the carrier may include a dielectric layer, a dielectric wafer or any other suitable type of a dielectric carrier. According to various embodiments, at least a surface portion of the carrier that may be brought in contact with the two-dimensional layer may consist of a dielectric material, e.g. silicon oxide ($SiO_2$), silicon oxynitride ($SiO_xN_y$), aluminum oxide ($Al_2O_3$), silicon carbide (SiC), etc.

According to various embodiments, forming the layer structure, as described herein, may include forming (e.g. depositing) a support layer over the carrier and forming (e.g. depositing) a two-dimensional layer over the support layer. Further forming the layer structure, as described herein, may include patterning the layer structure or at least one layer of the layer structure, e.g. the support layer. According to various embodiments, forming (e.g. depositing) a layer, e.g. the support layer or the two-dimensional layer, (e.g. depositing a metal support layer and depositing carbon directly on the metal support layer) may include a layering process as used in semiconductor industry. A layering process or deposition process, as referred to herein, may include a chemical vapor deposition (CVD) process and/or a physical vapor deposition (PVD) process. According to various embodiments, a chemical vapor deposition process (CVD process) may include a variety of modifications, as for example atmospheric pressure CVD (APCVD), low pressure CVD (LPCVD), ultrahigh vacuum CVD (UHVCVD), plasma enhanced CVD (PECVD), high density plasma CVD (HDP-CVD), remote plasma enhanced CVD (RPECVD), atomic layer deposition (ALD), atomic layer CVD (ALCVD), vapor phase epitaxy (VPE), metal organic CVD (MOCVD), hybrid physical CVD (HPCVD), and the like. According to various embodiments, carbon, silicon, germanium, nickel, cobalt, iron, ruthenium, rhodium, platinum, iridium, copper, gold, silver, tantalum, titanium nitride, silicon nitride, and the like, may be deposited using LPCVD, ALD, or atomic layer CVD (or using a PVD process). According to various embodiments, physical vapor deposition may include a variety of modifications, as for example sputtering or magnetron sputtering, ion-beam sputtering (IBS), reactive sputtering, high-power impulse magnetron sputtering (HIPIMS), vacuum evaporation, thermal evaporation, molecular beam epitaxy (MBE), pulsed laser deposition, electrochemical deposition (ECD), and the like.

According to various embodiments, the carrier or a layer formed over the carrier (e.g. the support layer, the two-dimensional layer, an auxiliary layer, etc.) may be patterned using, for example, a lithographic process (including, for example, applying a resist, exposing the resist, and developing the resist), and an etch process (e.g. a wet etch process using etch chemistry or a dry-etch process using, for example, plasma etching, reactive plasma etching, ion beam milling, and the like). Further, patterning a carrier (e.g. a layer or a wafer) may include applying a mask layer (e.g. a hard mask layer or a soft mask layer), patterning the mask layer to expose the underlying carrier, and selectively etching the underlying carrier. Further, a patterning process may further include resist stripping, e.g. after the etch process has been carried out. According to various embodiments, a mask layer may be used as part of the auxiliary layer structure, as described herein.

According to various embodiments, a catalytic metal, as described herein, may participate at the formation of the two-dimensional layer, e.g. nickel, copper (but also germanium) as catalytic metal layer may allow forming a graphene layer, wherein the catalytic metal may not primarily chemically react with the carbon. For processing carbon, as example, a corresponding catalytic metal may be any material, which may solve the carbon at high temperatures, wherein there may be no stable phase at room temperatures including the carbon and the catalytic metal, such that the carbon may segregate from the catalytic metal again. Alternatively, for processing carbon, as example, a corresponding catalytic metal may be any material that supports decomposition of hydrocarbon precursor molecules and rearrangement to a graphene layer, e.g. due to a high mobility of the carbon atoms along a surface of the catalytic material, as for example along a copper-surface, at relevant processing temperatures.

Figure 2:
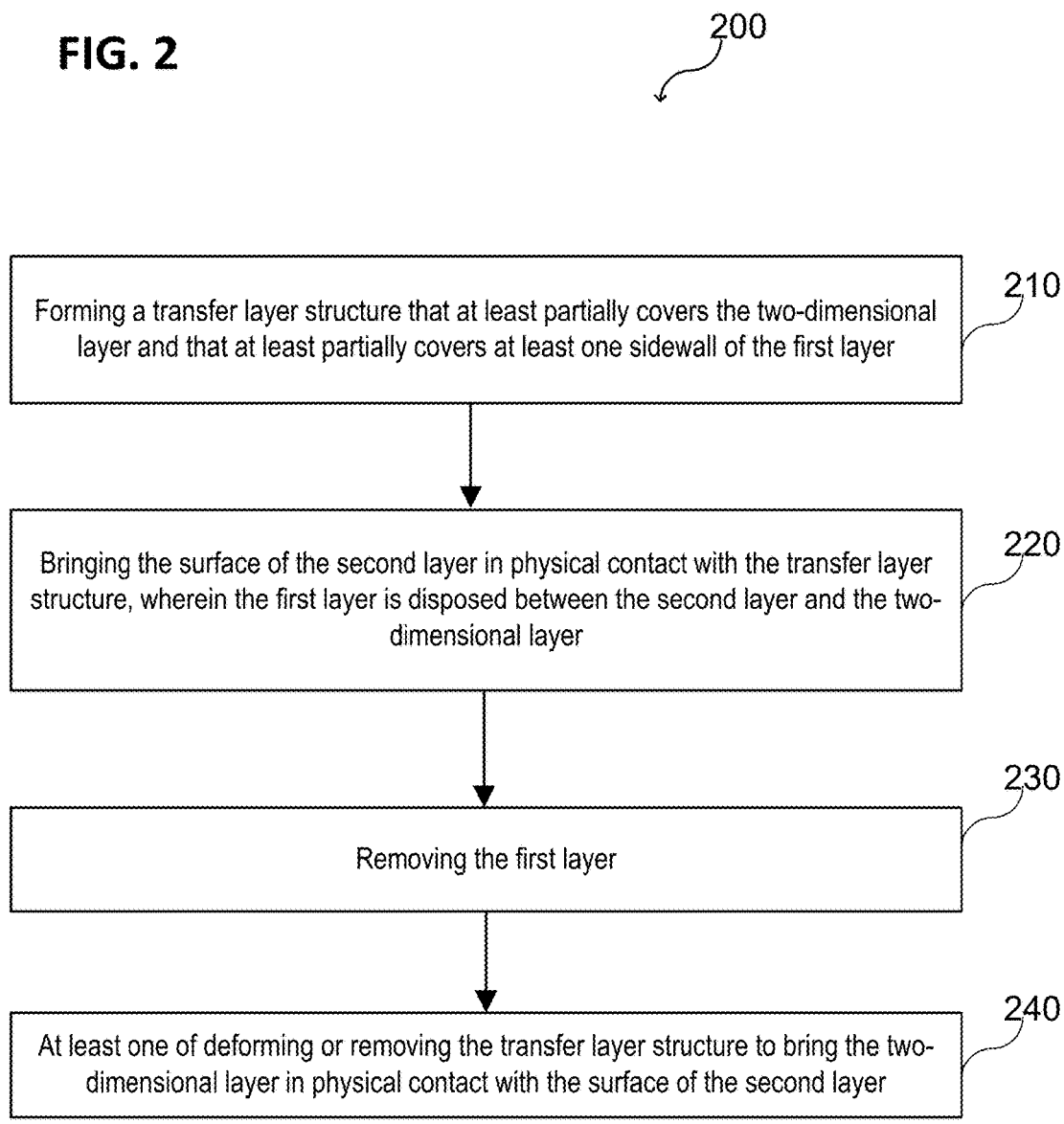
FIG. 2 shows a schematic flow diagram of a method for processing a carrier, according to various embodiments.

FIG. 2 illustrates a schematic flow diagram of a method 200 for processing a carrier, according to various embodiments, e.g. a method 200 for transferring a two-dimensional layer that is disposed on a surface of a first layer to a surface of a second layer, wherein the method 200 may include: in 210, forming a transfer layer structure that at least partially covers the two-dimensional layer and that at least partially covers at least one sidewall of the first layer; in 220, bringing the surface of the second layer in physical contact with the transfer layer structure, wherein the first layer is disposed between the second layer and the two-dimensional layer; and, subsequently, in 230, removing the first layer; and, subsequently, in 240, at least one of deforming or removing the transfer layer structure to bring the two-dimensional layer in physical contact with the surface of the second layer. According to various embodiments, the first layer may be a support layer and the second layer may be a carrier, as described herein.

Figure 3:
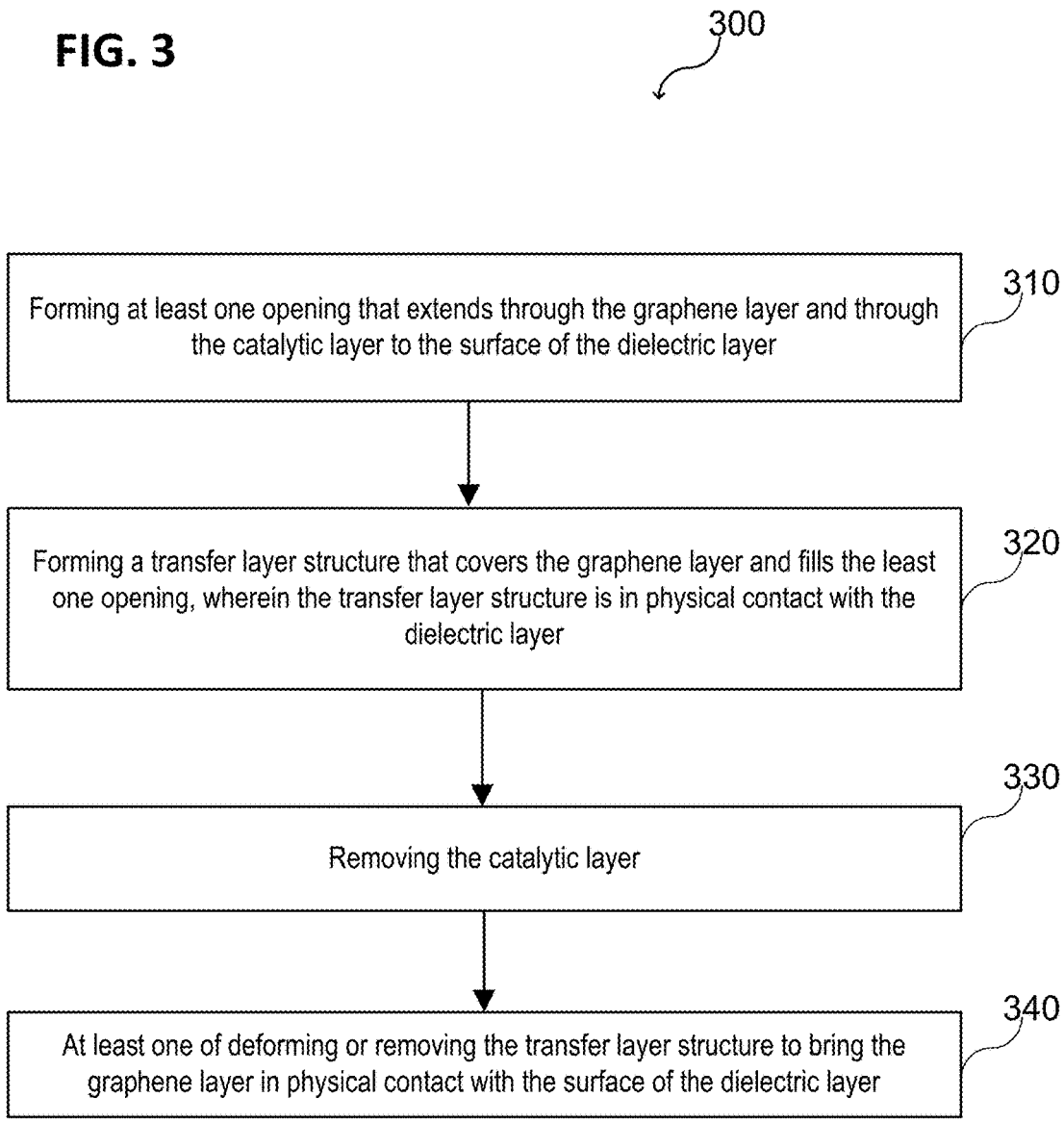
FIG. 3 shows a schematic flow diagram of a method for processing a carrier, according to various embodiments.

FIG. 3 illustrates a schematic flow diagram of a method 300 for processing a carrier, according to various embodiments, e.g. a method 300 for transferring a graphene layer that is disposed on a surface of a catalytic layer to a surface of a dielectric layer, wherein the dielectric layer is in physical contact with the catalytic layer, wherein the method 300 may include: in 310, forming at least one opening that extends through the graphene layer and through the catalytic layer to the surface of the dielectric layer; in 320, forming a transfer layer structure that covers the graphene layer and fills the least one opening, wherein the transfer layer structure is in physical contact with the dielectric layer; and, subsequently, in 330, removing the catalytic layer; and, subsequently, in 340, at least one of deforming or removing the transfer layer structure to bring the graphene layer in physical contact with the surface of the dielectric layer. According to various embodiments, the graphene layer is an example of a two-dimensional layer. According to various embodiments, the dielectric layer is an example of a carrier. According to various embodiments, the catalytic layer is an example of a support layer.

Various modifications and/or configurations of the methods 100, 200, 300 for processing a carrier and details referring to the used layers and processing steps are described in the following. The features and/or processing steps described in the following may be included in the methods 100, 200, 300 or may be combined with the methods 100, 200, 300, analogously.

Figure 4A:
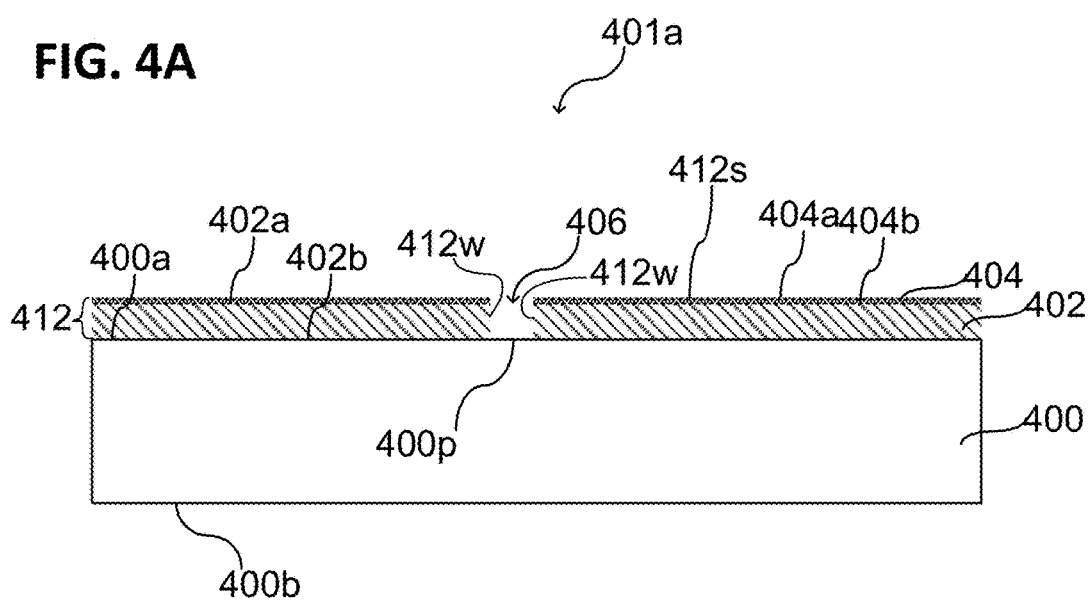
FIGS. 4A to 4C show respectively a carrier at various stages during processing, according to various embodiments.

FIG. 4A illustrates a carrier arrangement 401a in a schematic cross sectional view, e.g. after process 110 of method 100 has been carried out, at an initial processing stage of method 200, or after process 310 of method 300 has been carried out, for illustrating aspects of various embodiments.

According to various embodiments, the carrier arrangement 401a may include a carrier 400 (also referred to as second layer 400 or dielectric layer 400). The carrier 400 may be a dielectric carrier, e.g. a dielectric wafer 400, or the carrier 400 may include dielectric material, e.g. a dielectric surface region or a dielectric layer. According to various embodiments, a dielectric structure 400 (e.g. a dielectric layer 400) may be used as carrier 400, wherein the dielectric structure 400 may be disposed on any suitable other carrier, e.g. on a semiconductor wafer. According to various embodiments, the dielectric structure may be a surface layer of a semiconductor carrier. In various embodiments, the carrier 400 may be made of dielectric material or may include dielectric material such as, for example, silicon oxide (e.g. $SiO_2$), silicon nitride (e.g. $Si_3N_4$), silicon carbide (SiC), aluminum oxide ($Al_2O_3$), hafnium oxide ($HfO_2$), or zirconium oxide ($ZrO_2$).

According to various embodiments, the carrier arrangement 401a may include a support layer 402 disposed over (e.g. directly on) the carrier 400. The support layer 402 (also referred to as catalytic layer 402 or first layer 402) may have a first surface 402a facing away from the carrier 400 and a second surface 402b opposite the first surface 402a. According to various embodiments, the carrier 400 may have a first surface 400a facing towards the support layer 402 and a second surface 400b opposite the first surface 400a. According to various embodiments, the first surface 400a of the carrier 400 may be in direct physical contact with the second surface of the support layer 402.

According to various embodiments, the carrier arrangement 401a may include a two-dimensional layer 404. The two-dimensional layer 404 may be disposed over the support layer 402. The two-dimensional layer 404 may include or may consist of a two-dimensional material. According to various embodiments, the term "two-dimensional material" as used herein may, for example, be understood to include or refer to a material that crystallizes in a two-dimensional or planar structure, wherein a first geometric dimension (e.g. thickness) of the structure may be substantially smaller, e.g. at least two orders of magnitude smaller, e.g. at least three orders of magnitude smaller, e.g. at least four orders of magnitude smaller, or even smaller, than a second geometric dimension (e.g. length) and/or a third geometric dimension (e.g. width) of the structure. In one or more embodiments, the term "two-dimensional material" may be understood to include or refer to a material having the thinnest possible structure (one individual layer) derived from a material composed of several layers, e.g. a one carbon atom thick layer as for graphene, or a one $MoS_2$-unit thick layer as for $MoS_2$.

In various embodiments, the two-dimensional layer 404 (also referred to as two-dimensional material layer 404) may include or consist of graphene or a metal chalcogenide such as, for example, molybdenum disulphide, tungsten disulphide, or the like. In various embodiments, a two-dimensional material that provides the two-dimensional layer 404 may include or consist of graphane, germanene, and the like.

In accordance with one or more embodiments, a two-dimensional layer 404 (e.g. a graphene layer 404) may have a thickness of less than or equal to about 20 nm, for example in the range from about 0.5 nm to about 20 nm, for example about 0.34 nm (e.g. in case of a single monolayer of graphene).

In the case that the two-dimensional layer 404 is a graphene layer, the graphene layer 404 may be formed, for example, with the use of one or more of the following processes: Chemical Vapor Deposition (CVD) of graphene; formation of graphene utilizing solid phase carbon sources; solid state epitaxial growth of graphene, or any other type of suitable process for forming the graphene layer 404 over the support layer 402. According to various embodiments, the support layer 402 may be a seed layer for depositing the graphene layer 404 (or for depositing any other type of two-dimensional layer 404). According to various embodiments, the support layer 402 may be a catalytic layer (e.g. including copper, nickel, etc.) from which the graphene layer 404 has been segregated or on which surface the graphene layer 404 is reactively deposited.

In the case that the two-dimensional layer 404 is a graphene layer, the graphene layer 404 may include or consist of a plurality of crystallites or flakes that may, for example, have a size (e.g. diameter) of a few micrometers, e.g. about 1 µm. In various embodiments, the graphene layer 404 may be a continuous graphene layer that extends laterally over the entire carrier 400. Each of the crystallites may include or consist of one or more platelets that may, for example, include or consist of a few layers of graphene, e.g. up to five layers, e.g. a monolayer, a bilayer, a trilayer, etc., of graphene, wherein a monolayer of graphene may have a two-dimensional structure with a thickness of about 0.34 nm.

Figure 11:
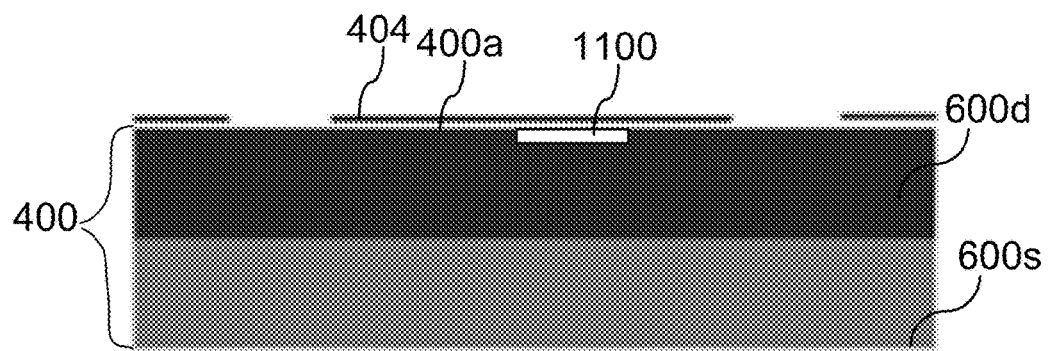
FIG. 11 shows a schematic view of a carrier after processing, according to various embodiments.

According to various embodiments, at least one electrode may be embedded into the carrier 400 (not illustrated in figures) for electrically contacting the two-dimensional layer 404 after the two-dimensional layer 404 has been transferred to the first surface 400a of the carrier 400 (see FIG. 11).

According to various embodiments, the carrier arrangement, as described herein, may be configured as any suitable electronic device, e.g. as a switch, a transistor, a sensor, a filter, a transmitter, a receiver, a transceiver, and the like. The two-dimensional layer 404 may be a functional layer of the electronic device, e.g. including a two-dimensional material with a band gap. According to various embodiments, the carrier arrangement may be covered with an additional dielectric material or may include an additional dielectric material layer, e.g. the carrier arrangement may be covered with a protection layer. According to various embodiments, at least a portion of the two-dimensional layer 404 may be part of one or more passive and/or active elements such as, e.g., sensors, resistors, capacitors, transistors (e.g., bipolar transistors, field effect transistors, etc.), diodes, thyristors, or the like.

According to various embodiments, the support layer 402 and the two-dimensional layer 404 disposed over the carrier 400 may be referred to as a layer structure 412. In other words, a layer structure 412 may be formed at least one of over and in the carrier 400, the layer structure 412 may include the support layer 402 and the two-dimensional layer 404, as described herein. The layer structure 412 may include at least one opening 406 that exposes a portion 400p of the carrier 400. According to various embodiments, the at least one opening 406 may extend through the support layer 402 and through the two-dimensional layer 404. According to various embodiments, the at least one opening (e.g. one or more than one opening) may be formed by partially removing the two-dimensional layer 404 and the support layer 402, or in other words by patterning the layer structure 412. According to various embodiments, the patterning process for forming the at least one opening 406 into the layer structure 412 may include removing selected portions of the layer structure 412. Since a plurality of processes may be involved, according to various embodiments, there are various possibilities to perform a patterning process, wherein aspects may be: selecting at least one portion of a surface layer (or a material) which shall be removed, e.g. using at least one lithographic process; and removing the selected portions of a surface layer, e.g. using at least one etch process.

According to various embodiments, patterning the layer structure 412 may include forming a patterned mask layer over the layer structure 412 (e.g. a soft mask including a resist or a hard mask including hard mask material, e.g. any suitable hard mask material that can be selectively removed from the layer structure 412 if necessary).

Figure 6A:
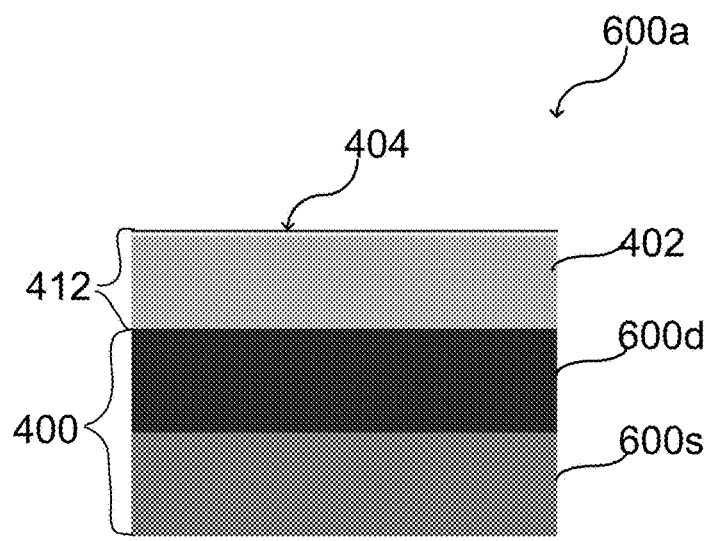
FIGS. 6A to 6I show respectively a carrier at various stages during processing, according to various embodiments.
Figure 6B:
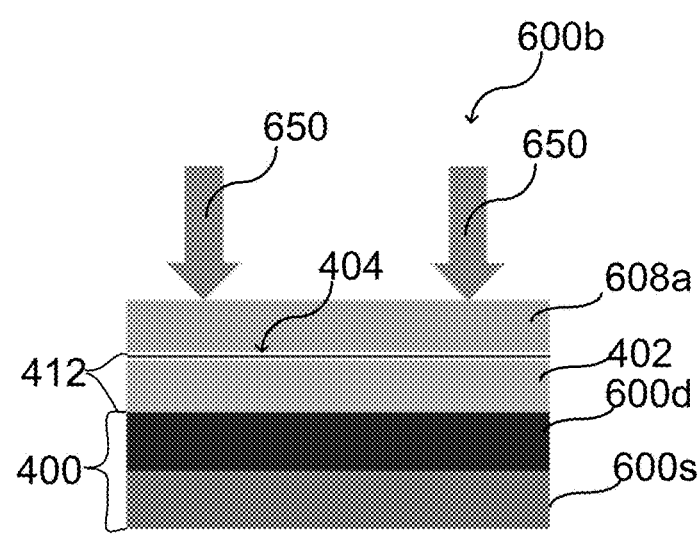
Figure 6C:
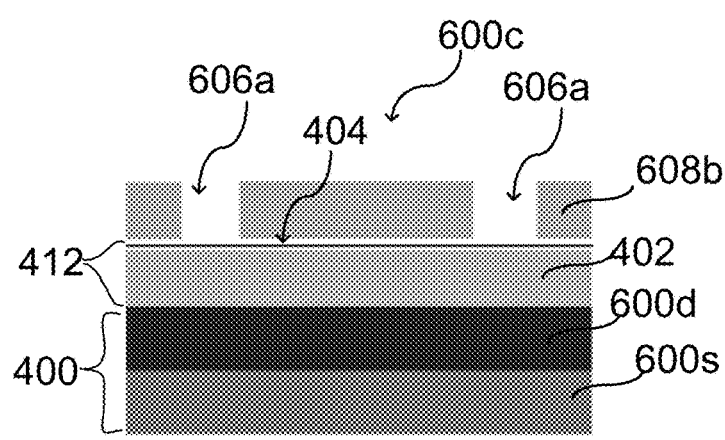
Figure 6D:
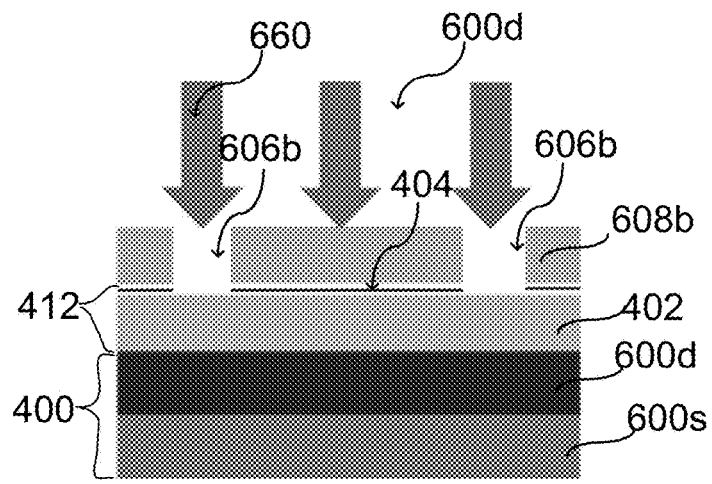
Figure 6E:
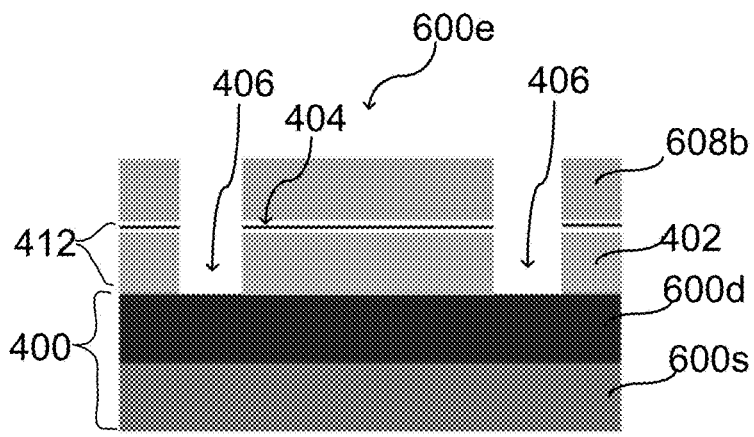
Figure 6F:
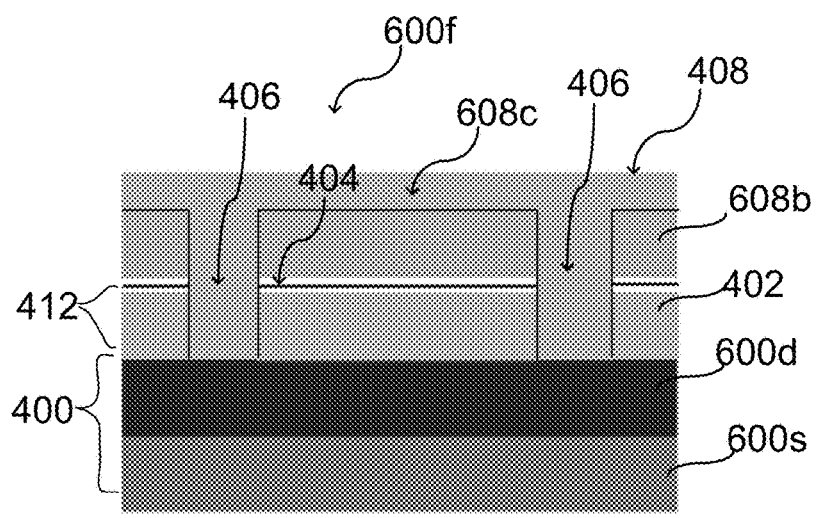
Figure 6G:
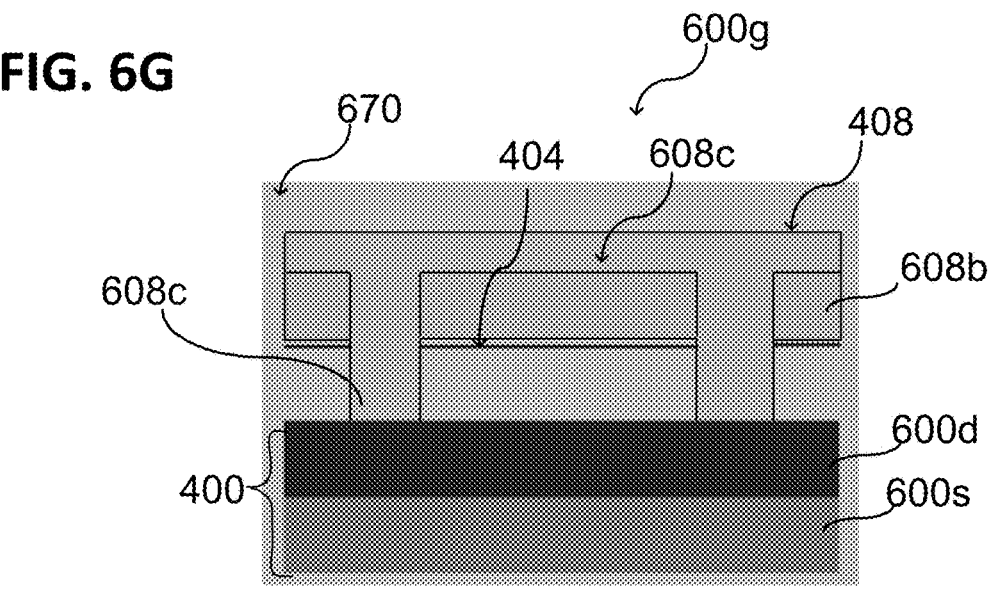
Figure 6H:
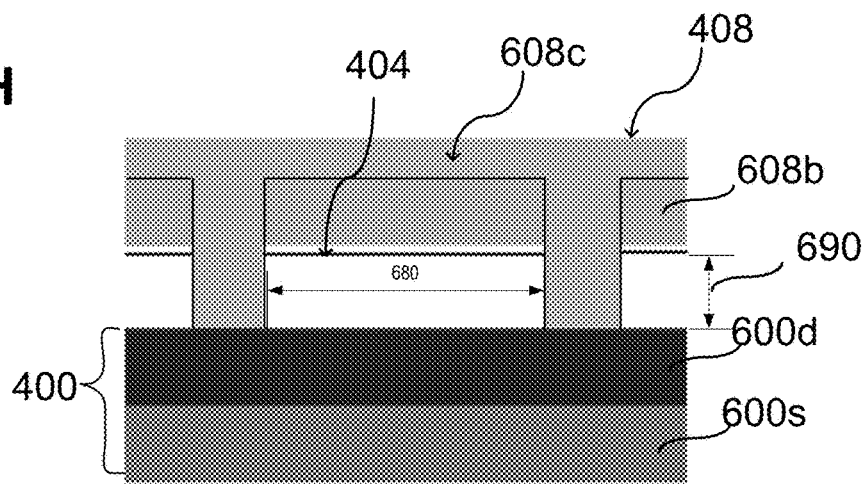

According to various embodiments, a mask material may be used for patterning the layer structure 412 that can be also used as transfer structure for the transfer processes of the two-dimensional layer 404 as described herein (see FIG. 6C and FIG. 6H).

Figure 4B:
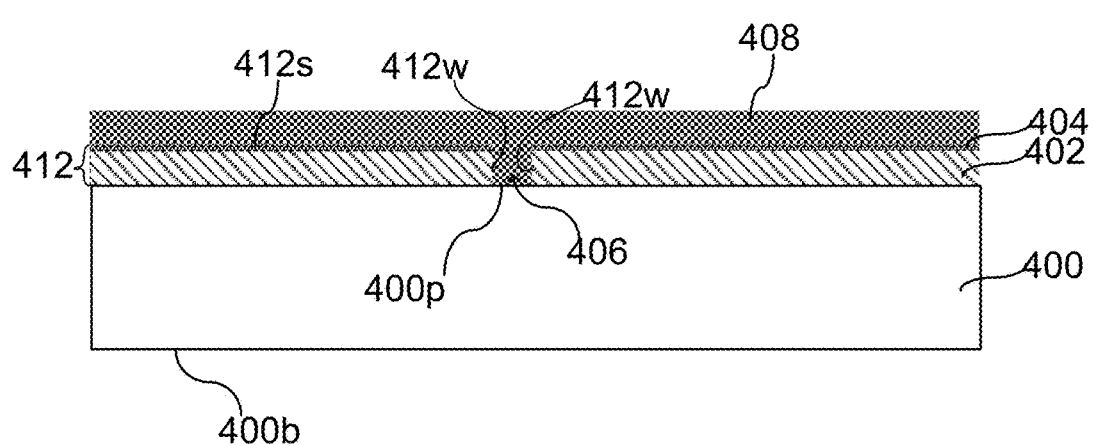

FIG. 4B illustrates a carrier arrangement 401b in a schematic cross sectional view, e.g. after process 110 and process 120 of method 100 have been carried out, after process 210 of method 200 has been carried out, or after process 310 and process 320 of method 300 have been carried out, for illustrating aspects of various embodiments.

According to various embodiments, the carrier arrangement 401b may include an auxiliary layer structure 408. The auxiliary layer structure 408 may at least partially cover the layer structure 412 and at least partially fill the at least one opening 406 that is provided in the layer structure 412. According to various embodiments, the at least one opening 406 may be completely filled up by the material of the auxiliary layer structure 408, e.g. by a polymer, as, for example, PMMA. The auxiliary layer structure 408 may include a single layer, as, for example, illustrated in FIG. 4B. Alternatively, the auxiliary layer structure 408 may include two or more than two layers (see FIG. 6C and FIG. 6H).

As illustrated in FIGS. 4A and 4B, the two-dimensional layer 404 may have a first surface 404a facing away from the support layer 402 and a second surface 404b opposite the first surface 404a. The second surface 404b of the two-dimensional layer 404 may be in direct physical contact with the first surface 402a of the support layer 402. Further, the first surface 404a of the two-dimensional layer 404 may be in direct physical contact with the auxiliary layer structure 408. According to various embodiments, the first surface 404a of the two-dimensional layer 404 may define the surface 412s of the layer structure 412 facing away from the carrier 400. Further, as illustrated in FIGS. 4A and 4B, the at least one opening 406 may define or provide at least one sidewall 412w of the layer structure 412. The at least one sidewall 412w of the layer structure 412 may extend into a vertical direction, for example, perpendicular to the surface 412s of the layer structure 412.

According to various embodiments, the auxiliary layer structure 408 may cover the surface 412s of the layer structure 412 and the auxiliary layer structure 408 may cover the at least one sidewall 412w of the layer structure 412. In other words, the auxiliary layer structure 408 may be in direct physical contact with the surface 412s and the at least one sidewall 412w of the layer structure 412. Therefore, the two-dimensional layer 404 may be bound to the auxiliary layer structure 408.

Figure 4C:
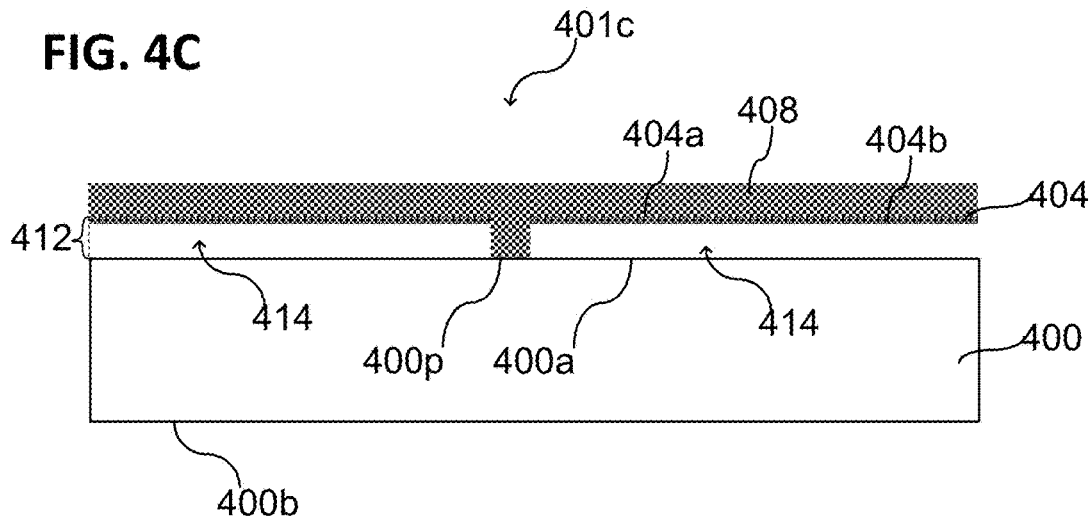

FIG. 4C illustrates a carrier arrangement 401c in a schematic cross sectional view, e.g. after process 110, process 120 and process 130 of method 100 have been carried out, after process 210, process 220 and process 230 of method 200 have been carried out, or after process 310, process 320, and process 330 of method 300 have been carried out, for illustrating aspects of various embodiments.

According to various embodiments, the support layer 402 of the layer structure 412 may be removed, e.g. completely. The carrier arrangement 401c may include free space 414 that is not filled with a solid material, wherein the free space 414 may be provided by removing, e.g. etching away, the support layer 402 of the layer structure 412. According to various embodiments, the two-dimensional layer 404 may be carried spaced apart from the carrier 400 by the auxiliary layer structure 408. Therefore, the two-dimensional layer 404 may not swim away during a wet etch process that is carried out to remove the support layer 402. Further, the auxiliary layer structure 408 may be used to drop the two-dimensional layer 404 at a defined position on the first surface 400a of the carrier 400.

As illustrated in FIG. 4B and FIG. 4C, the auxiliary layer structure 408 may be in direct physical contact with the first surface 400a of the carrier 400, wherein the position, where the auxiliary layer structure 408 contacts the first surface 400a of the carrier 400, may be defined by the at least one opening 406 that is provided in the layer structure 412 before the support layer 402 has been removed.

According to various embodiments, removing the support layer 402 may include at least partially exposing the second surface 404b of the two-dimensional layer 404. According to various embodiments, the auxiliary layer structure 408 may extend through the two-dimensional layer 404. The first surface 400a of the carrier 400 may face the second surface 404b of the two-dimensional layer 404, so that a face to face transfer of the two-dimensional layer 404 to the first surface 400a of the carrier 400 may be carried out by removing (see FIGS. 9A to 9C) and/or deforming (see FIG. 6I) the auxiliary layer structure 408.

Figure 5A:
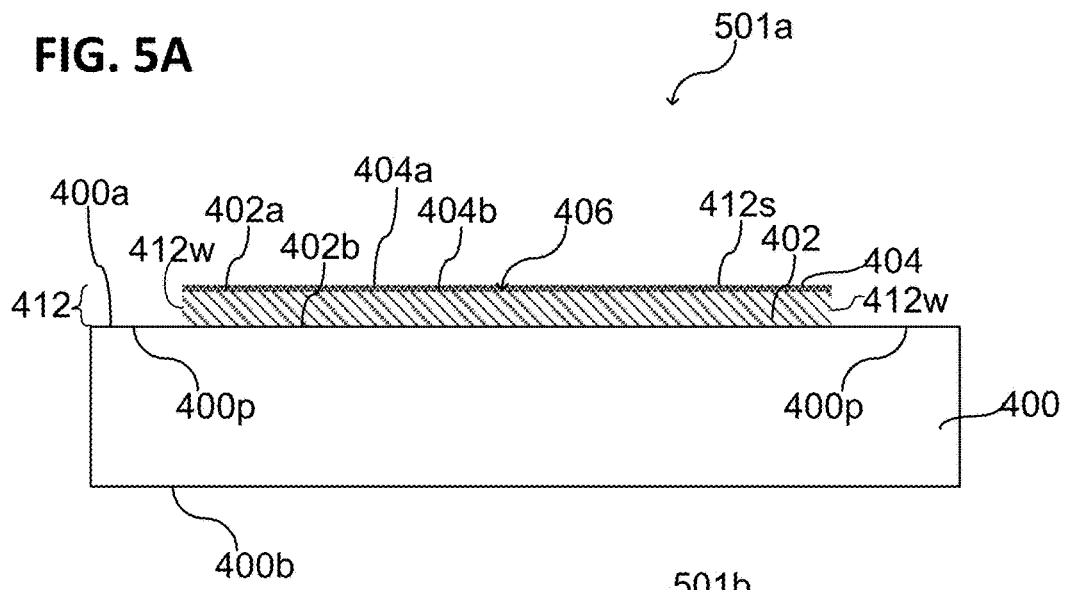
FIGS. 5A to 5C show respectively a carrier at various stages during processing, according to various embodiments.
Figure 5B:
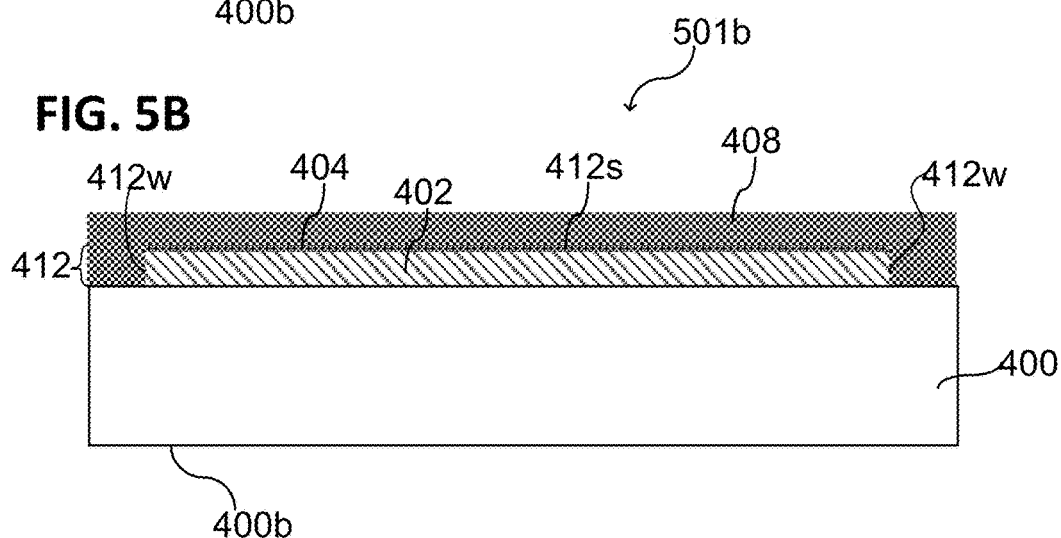
Figure 5C:
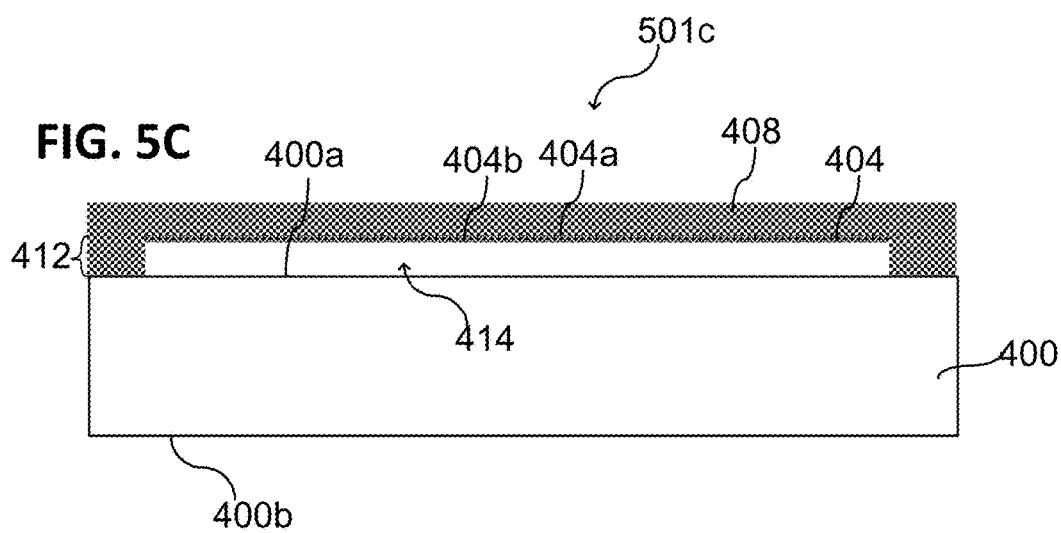

FIG. 5A, FIG. 5B and FIG. 5C illustrate a carrier arrangement 501a, 501b, 501c in a schematic cross sectional view respectively, e.g. at various stages during method 100, method 200, or method 300 is carried out, for illustrating aspects of various embodiments, in analogy to the carrier arrangement described with reference to FIGS. 4A to 4C.

According to various embodiments, the layer structure 412 may only partially cover the carrier 400. In this case, a portion 400p of the carrier may be free of the layer structure 412. This may be achieved by forming the support layer 402 and the two-dimensional layer 404 only over a part of the first surface 400a of the carrier 400 or, alternatively, by completely covering the first surface 400a of the carrier 400 with the layer structure 412 and, subsequently, partially removing (e.g. patterning) the layer structure 412 to expose at least one portion 400p of the carrier 400.

As illustrated in FIGS. 5A and 5B, the layer structure 412 may have at least one sidewall 412w that is covered with the auxiliary layer structure 408, in analogy as described in FIGS. 4A to 4C for the at least one sidewall 412w that is defined by the at least one opening. The at least one sidewall 412w of the layer structure 412 may extend into a vertical direction, for example, perpendicular to the two-dimensional layer 404.

According to various embodiments, the auxiliary layer structure 408 may cover the surface 412s of the layer structure 412 and the auxiliary layer structure 408 may cover the at least one sidewall 412w of the layer structure 412. In other words, the auxiliary layer structure 408 may be in direct physical contact with the surface 412s and the at least one sidewall 412w of the layer structure 412. Therefore, the two-dimensional layer 404 may be bound to the auxiliary layer structure 408. Illustratively, the layer structure 412 may be at least partially encapsulated by the auxiliary layer structure 408.

As illustrated in FIG. 5C, in analogy to FIG. 4C, the support layer 402 of the layer structure 412 may be removed, e.g. completely. The carrier arrangement 501c may include free space 414 that is not filled with a solid material, wherein the free space 414 may be provided by removing, e.g. etching away, the support layer 402 of the layer structure 412. Therefore, the auxiliary layer structure 408 may only partially encapsulate layer structure 412 so that an etchant (e.g. a wet etchant) can be brought in contact with the support layer 402. According to various embodiments, the two-dimensional layer 404 may be carried spaced apart from the carrier 400 by the auxiliary layer structure 408. Therefore, the two-dimensional layer 404 may not swim away during a wet etch process that is carried out to remove the support layer 402. Further, the auxiliary layer structure 408 may be used to drop the two-dimensional layer 404 at a defined position on the first surface 400a of the carrier 400.

As illustrated in FIG. 5B and FIG. 5C, the auxiliary layer structure 408 may be in direct physical contact with the first surface 400a of the carrier 400, wherein the position, where the auxiliary layer structure 408 contacts the first surface 400a of the carrier 400, may be defined by the lateral extension of the layer structure 412.

According to various embodiments, the second surface 404b of the two-dimensional layer 404 may be exposed after the support layer 402 has been removed. According to various embodiments, the auxiliary layer structure 408 may not extend through the two-dimensional layer 404. The first surface 400a of the carrier 400 may face the second surface 404b of the two-dimensional layer 404, so that a face to face transfer of the two-dimensional layer 404 to the first surface 400a of the carrier 400 may be carried out by removing (see FIGS. 9A to 9C) and/or deforming (see FIG. 6I) the auxiliary layer structure 408.

FIGS. 6A to 6I show respectively a carrier 400 at various stages during processing, e.g. during method 100 or 300 is carried out, according to various embodiments, as described herein.

According to various embodiments, at a first processing stage 600a, as illustrated in FIG. 6A, the carrier 400 may be covered by the support layer 402 and a two-dimensional layer 404 may be formed over the support layer 402. According to various embodiments, the carrier 400 may include a silicon portion 600s, e.g. electrically conductive bulk silicon, and a dielectric portion 600d, e.g. consisting of silicon oxide or any other dielectric material, or, in other words, the carrier 400 may have a surface layer 600d consisting of dielectric material, as already described. The support layer 402 may be a copper layer and the two-dimensional layer 404 may be a graphene monolayer or bilayer deposited over the copper layer by vapor deposition (e.g. CVD or PVD).

According to various embodiments, at a second processing stage 600b, as illustrated in FIG. 6B, a first auxiliary layer 608a (e.g. first polymer layer 608a, resist layer 608a, or a layer consisting of any other suitable material) may be formed over the two-dimensional layer 404. In case that the first auxiliary layer 608a includes a photo resist, the first auxiliary layer 608a may be patterned by exposing the first auxiliary layer 608a partially to light 650. Subsequently, the portions of the first auxiliary layer 608a that have been exposed to light may be removed, as illustrated in FIG. 6C. Illustratively, the first auxiliary layer 608a may be a soft mask that has been patterned by lithographic processes, as typically used in semiconductor industry. In other words, the two-dimensional layer 404 may be partially exposed at a third processing stage 600c by partially removing the first auxiliary layer 608a. Illustratively, a patterned first auxiliary layer 608b may be provided over the two-dimensional layer 404, as illustrated in FIG. 6C. There may be various other processes to provide a patterned first auxiliary layer 608b over the two-dimensional layer 404, e.g. providing a patterned hard mask layer 608b.

According to various embodiments, the one or more openings 606a provided by the patterned first auxiliary layer 608b may define the position for the at least one opening 406 that is formed into the layer structure 412, as illustrated in FIG. 6D and FIG. 6E.

According to various embodiments, the two-dimensional layer 404 may be partially exposed by the one or more openings 606a provided by the patterned first auxiliary layer 608b so that the exposed portions of the two-dimensional layer 404 may be removed at a fourth processing stage 600d, as illustrated in FIG. 6D. According to various embodiments, in case that the two-dimensional layer 404 is a graphene layer, an oxygen plasma etching 660 may be used to partially remove the two-dimensional layer 404. According to various embodiments, the etch process 660 may be configured to selectively remove the one or more exposed portions of the two-dimensional layer 404.

According to various embodiments, the support layer 402 may be partially exposed by the one or more openings 606b provided in the first auxiliary layer 608a and in the two-dimensional layer 404 so that the exposed portions of the support layer 402 may be removed at a fifth processing stage 600e, as illustrated in FIG. 6E. According to various embodiments, in case that the support layer 402 is a copper layer, a dry or wet etching may be used to partially remove the support layer 402, e.g. using an acid as etchant, e.g. at least one of HCl, HNO$_3$, FeCl$_3$, or any other suitable etchant. According to various embodiments, the dry or wet etch process may be configured to selectively remove the one or more exposed portions of the support layer 402.

According to various embodiments, as illustrated in FIGS. 6D and 6E, the layer structure 412 may be patterned, or, in other words, one or more openings 406 may be provided in the layer structure 412, as described herein. Thereby, the carrier 400, e.g. the dielectric portion 600d of the carrier 400 may be partially exposed.

According to various embodiments, at a sixth processing stage 600f, as illustrated in FIG. 6F, a second auxiliary layer 608c may be formed over the patterned first auxiliary layer 608b, the second auxiliary layer 608c may also fill the one or more openings 406 that are provided in the layer structure 412. According to various embodiments, the patterned first auxiliary layer 608b and the second auxiliary layer 608c may together form the auxiliary layer structure 408, as described herein. According to various embodiments, the second auxiliary layer 608c may include or may consist of a polymer, a resist, or any other suitable material. According to various embodiments, the first auxiliary layer 608a and the second auxiliary layer 608c may consist of the very same material or, alternatively, of different materials.

According to various embodiments, the auxiliary layer structure 408 may be formed of any suitable material, e.g. a metal, a polymer, a resist, etc., wherein the material of the auxiliary layer structure 408 may be selected so that the support layer 402 may be removed selectively, that means, without substantially removing the auxiliary layer structure 408. Further, the material of the auxiliary layer structure 408 may be selected so that the auxiliary layer structure 408 may be removed selectively, that means, without substantially removing the two-dimensional layer 404 and material of the carrier 400.

According to various embodiments, at a seventh processing stage 600g, as illustrated in FIG. 6G, the support layer 402 may be removed, e.g. by a wet etchant 670. The two-dimensional layer 404 may be carried by the auxiliary layer structure 408. According to various embodiments, the auxiliary layer structure 408 may form a bridge structure extending over the carrier 400, wherein the two-dimensional layer 404 is held spaced apart from the carrier 400 in a pre-defined position, as illustrated in FIG. 6H.

The two-dimensional layer 404 may be in direct contact with the auxiliary layer structure 408, e.g. with the patterned first auxiliary layer 608b. As illustrated in FIG. 6H, the two-dimensional layer 404 may be exposed by removing the support layer 402.

According to various embodiments, the thickness of the support layer 402 may not be limited in the processing, as described herein. The support layer 402 may include a copper layer having a thickness greater than about 0.5 μm or 1 μm, e.g. a thickness in the range from about 0.5 μm to about 10 μm, from about 1 μm to about 10 μm, or from about 2 μm to about 10 μm. According to various embodiments, the thickness of the support layer 402 may define the distance 690 between the two-dimensional layer 404 and the surface of the carrier 400 (e.g. in the range from about 0.5 μm to about 10 μm, from about 1 μm to about 10 μm, or from about 2 μm to about 10 μm) after the support layer 402 has been removed.

The distance 680 between two adjacent pillars (e.g. the portions of the auxiliary layer structure 408 that are in contact with the carrier 400, see FIG. 6H) of the auxiliary layer structure 408 may be greater than about 100 μm, e.g. in the range from about 100 μm to about 10 mm, or greater than about 10 mm. The materials and layer thicknesses used for providing the auxiliary layer structure 408 may define the suitable distance between adjacent pillars of the auxiliary layer structure 408. According to various embodiments, the auxiliary layer structure 408 may have a thickness in the range from about 1 μm to about 10 μm.

Figure 6I:
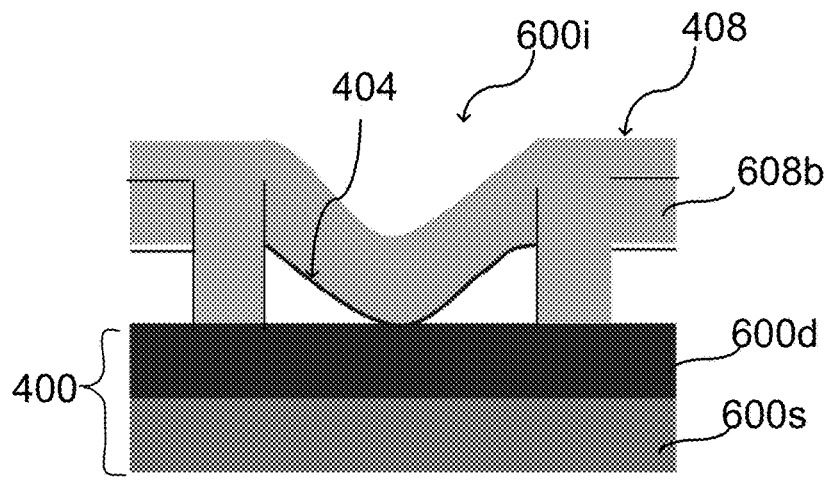

According to various embodiments, at a further processing stage 600i, as illustrated in FIG. 6I, the auxiliary layer structure 408 may be deformed so that the two-dimensional layer 404 is brought in direct physical contact with the surface of the carrier 400. However, the auxiliary layer structure 408 may be also completely or partially removed to bring the two-dimensional layer 404 in direct physical contact with the surface of the carrier 400.

According to various embodiments, the support layer 402 (e.g. also the carrier 400) may be selected to be temperature stable up to a critical temperature in the range from about 400° C. to about 1000° C. Therefore, the two-dimensional layer 404, e.g. the graphene layer, may be formed e.g. by direct deposition or by plasma assisted deposition below the critical temperature of the support layer 402.

According to various embodiments, the auxiliary layer structure 408 may be used temporarily to hold the two-dimensional layer 404. In other words, the auxiliary layer structure 408 may be removed completely after the two-dimensional layer 404 has been transferred from the support layer 402 (e.g. from the first surface 402a of the support layer 402, see FIGS. 4A and 4B) to the carrier 400 (e.g. to the first surface 400a of the carrier, see FIG. 10).

As illustrated in FIG. 6H, the two-dimensional layer 404 may be exposed by removing the support layer 402, and, therefore, one or more cleaning processes may be carried out to remove metal contaminations. Therefore, pre-defined concentration specifications for metal impurities may be achieved for the two-dimensional layer 404.

As illustrated in FIG. 6I, after removing the wet etchant 670 (or, in case at least one wet cleaning process has been carried out, after removing the wet cleaning liquid) the two-dimensional layer 404 may be brought in contact with the dielectric portion 400d of the carrier 400. The contact may be established first in the middle (with respect to the lateral direction) of the carrier 400. According to various embodiments, a small bend in the auxiliary layer structure 408 may be sufficient to bring the two-dimensional layer 404 in contact with the carrier 400. According to various embodiments, the bond process for adhering the two-dimensional layer 404 to the carrier may be triggered in the middle (with respect to the lateral direction) of the carrier 400. Such a bond process may be performed in standard wafer bond tool used for silicon wafer bonding.

Figure 7:
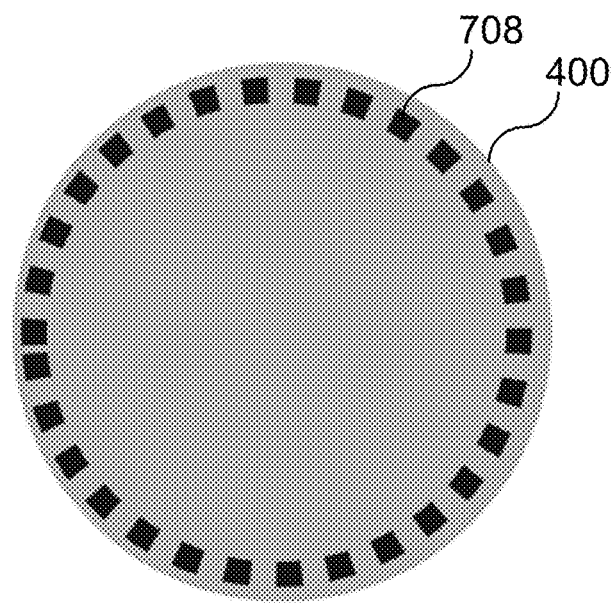
FIG. 7 shows a schematic view of a carrier, according to various embodiments.

As illustrated in FIG. 7, the pillars 708 of the auxiliary layer structure 408 may be provided at the outer edge region of the carrier 400, wherein the carrier 400 may be for example a wafer. According to various embodiments, the pillars 708 of the auxiliary layer structure 408 may be provided in kerf regions of the wafer 400.

According to various embodiments, the auxiliary layer structure 408 (e.g. the polymer bridge 408) may also be formed without the patterning process described in FIGS. 6A to 6E. Therefore, copper may be used for forming the support layer 402, wherein the thickness of the copper layer 402 may be selected, e.g. less than about 1 µm, e.g. in the range from about 0.1 µm to about 1 µm, so that holes may be provided in the copper layer 402. The graphene layer 404 may for example only on the surface of the copper layer 402 (see FIG. 8) and not over the holes in the copper layer 402. However, this may lead to a higher defect density in the graphene layer 404 compared to the processing using a thicker support layer 402, as described before.

Figure 8:
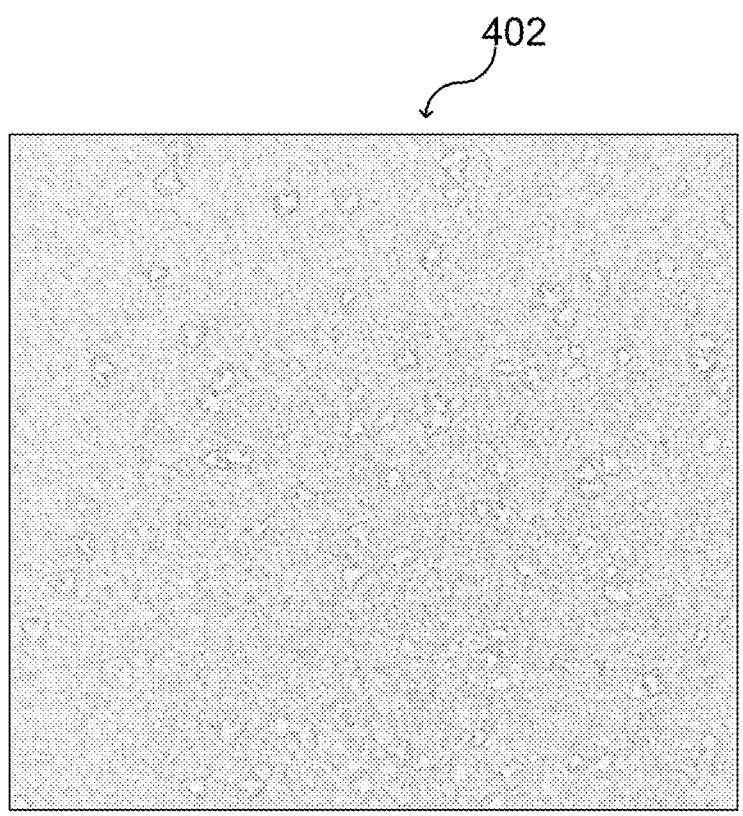
FIG. 8 shows a schematic view of a surface of a copper layer, according to various embodiments.

FIG. 8 illustrates a top view of a copper layer 402 having a thickness less than about 1 µm, e.g. in the range from about 0.1 µm to about 0.5 µm, so that holes may be provided in the copper layer 402 due to thermal compression during cooling after depositing the copper layer 402 over the carrier 400.

Figure 9A:
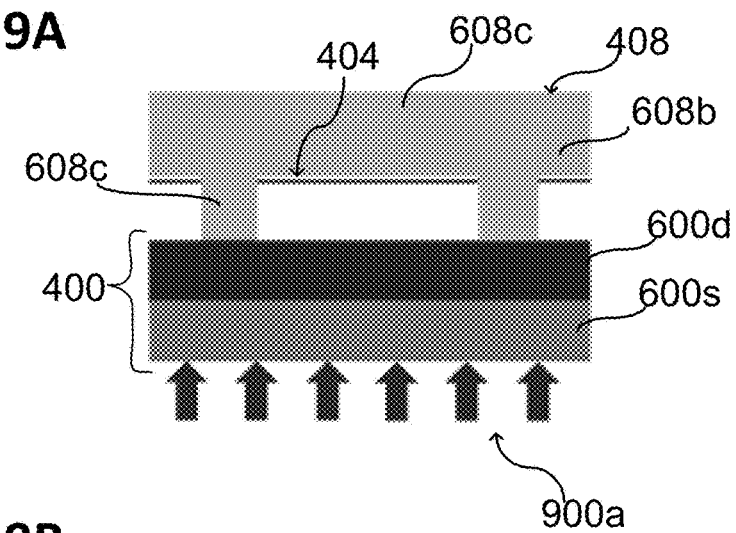
FIGS. 9A to 9C show respectively a carrier at various stages during processing, according to various embodiments.
Figure 9B:
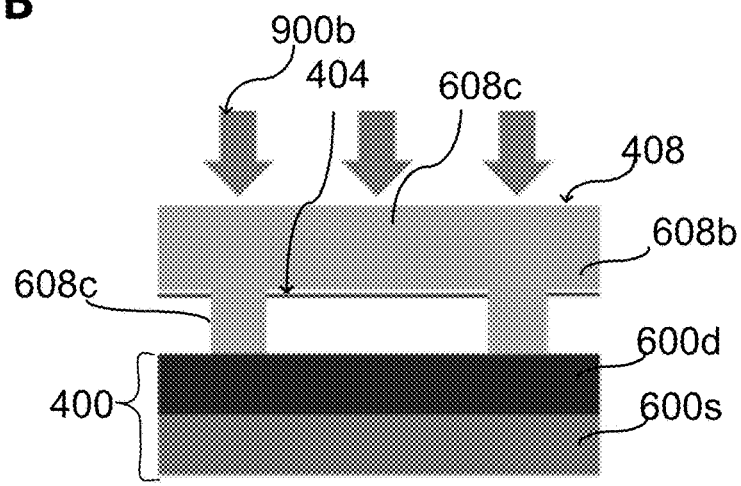
Figure 9C:
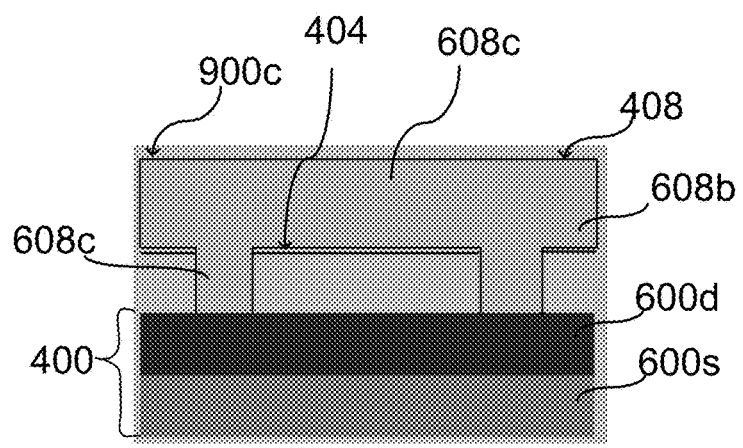

As illustrated in FIG. 9A, FIG. 9B, and FIG. 9C, the removing of the auxiliary layer structure 408 and, therefore, the transferring of the two-dimensional layer 404 to the carrier 400 may be carried out by using various processes.

According to various embodiments, the auxiliary layer structure 408 may include for example a polymer or any other material that can be evaporated at moderate temperatures, e.g. below 400° C., so that the auxiliary layer structure 408 can be removed by heating 900a the carrier 400 and/or the auxiliary layer structure 408. Illustratively, the auxiliary layer structure 408 may be thermally evaporated so that the two-dimensional layer 404 is brought in contact with the carrier 400 (see FIG. 9A and FIG. 10). The auxiliary layer structure 408 may consist of PMMA that may be decomposed without any residue at about 300° C.

Figure 10:
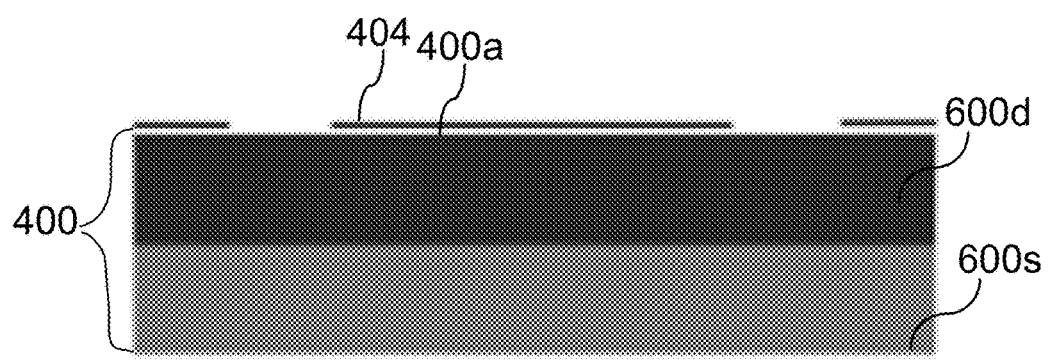
FIG. 10 shows a schematic view of a carrier after processing, according to various embodiments.

Alternatively, the auxiliary layer structure 408 may include for example a polymer or any other material that can be solved in a corresponding solvent, e.g. in an acetone based solvent, so that the auxiliary layer structure 408 can be removed by using the solvent in gaseous form 900b (see FIG. 9B and FIG. 10) or in liquid form 900c (see FIG. 9C and FIG. 10).

According to various embodiments, the auxiliary layer structure 408 may include for example a metal, a metalloid, or any other material that can be etched away selectively, that means without substantially removing the two-dimensional layer 404 and the carrier 400, so that the auxiliary layer structure 408 can be removed by an etch process, e.g. dry etching or wet etching.

According to various embodiments, by removing the auxiliary layer structure 408 the two-dimensional layer 404 may be laid down on the surface 400a of the carrier 400, as illustrated in FIG. 10. For a better illustration, the two-dimensional layer 404 is illustrated in the figures spaced apart from the support layer 402, the auxiliary layer structure 408, and/or the carrier 400; however, the two-dimensional layer 404 is respectively in direct contact with the support layer 402, the auxiliary layer structure 408, and/or the carrier 400.

According to various embodiments, the support layer 402 including copper can be formed by a CVD oven process, wherein also the carrier 400 is annealed during the CVD oven process. Therefore, a copper contamination may be found in the carrier 400. Further, if the copper layer is formed too thin, holes may be formed in the copper layer during an anneal process (see FIG. 8). A copper contamination in the carrier 400 may be detected by trace analytics. At wafer level, openings may be found in the two-dimensional layer 404, since the auxiliary layer structure 408 may extend through the two-dimensional layer 404 during the transfer.

As illustrated in FIG. 11, the carrier 400 may include at least one embedded electrode 1100 exposed at the first surface 400a of the carrier 400, the first surface 400a facing the two-dimensional layer 404. According to various embodiments, the carrier 400 may include at least one metallization structure 1100 or metallization layer 1100 disposed in a surface region of the carrier 400, the surface region facing the two-dimensional layer 404.

According to various embodiments, a method for processing a carrier may include: forming or providing a layer structure over the carrier, the layer structure including a support layer and a two-dimensional layer disposed over (e.g. directly on) the support layer; wherein the layer structure has at least one opening that exposes a portion of the carrier (or wherein the layer structure has at least one opening that extends through the support layer and the through two-dimensional layer); forming an auxiliary layer structure, wherein the auxiliary layer structure at least partially (e.g. partially or completely) covers the layer structure and at least partially (e.g. partially or completely) fills the at least one opening; and removing the support layer of the layer structure. Therefore, the two-dimensional layer may be carried spaced apart from the carrier by the auxiliary layer structure. In other words, a free space is provided between the two-dimensional layer and the carrier, wherein the free space does not contain solid material.

According to various embodiments, the auxiliary layer structure may extend from a surface of the layer structure into the at least one opening of the layer structure so that the at least one opening is at least partially (e.g. partially or completely) filled by the auxiliary layer structure, or in other words, by material of the auxiliary layer structure.

According to various embodiments, the at least one opening of the layer structure may include a first opening region adjacent to the two-dimensional layer and a second opening region adjacent to the support layer. According to various embodiments, the auxiliary layer structure may extend from a surface of the layer structure at least through the first opening region. In other words, the auxiliary layer structure may extend from a surface of the layer structure at least into the second opening region, so the second opening region is at least partially (e.g. partially or completely) filled by the auxiliary layer structure, or in other words, by material of the auxiliary layer structure.

According to various embodiments, the auxiliary layer structure or the material of the auxiliary layer structure may or may not cover the sidewalls of the at least one opening of the layer structure. According to various embodiments, the auxiliary layer structure may cover the sidewalls and the bottom of the at least one opening of the layer structure in form of a liner structure. According to various embodiments, the auxiliary layer structure may cover the bottom (e.g. the surface of the exposed portion of the carrier) of the at least one opening of the layer structure partially or completely. According to various embodiments, the auxiliary layer structure may cover the sidewall (e.g. a side of the layer structure exposed by the at least one opening provided in the layer structure) of the at least one opening of the layer structure partially or completely.

According to various embodiments, the auxiliary layer structure may at least partially encapsulate the two-dimensional layer.

According to various embodiments, the two-dimensional layer may include at least one graphene sheet, e.g. one graphene sheet, e.g. two, three, or more than three graphene sheets.

According to various embodiments, the two-dimensional layer may include at least one graphene monolayer, e.g. one graphene monolayer, e.g. two, three, or more than three graphene monolayers.

According to various embodiments, the support layer is at least one of an electrically conductive support layer or an electrically semi-conductive support layer. According to various embodiments, the support layer may include a catalytic metal.

According to various embodiments, the support layer may have a thickness greater than 0.5 µm or 1 µm. According to various embodiments, the support layer may be a copper layer having a thickness greater than about 0.5 µm or 1 µm. According to various embodiments, the support layer may have a thickness greater than about 2 µm. As an example, the support layer may be a copper layer having a thickness greater than about 2 µm. According to various embodiments, the support layer may be a catalytic metal layer having a thickness in the range from about 0.5 µm to about 5 µm, from about 1 µm to about 5 µm, or from about 2 µm to about 5 µm.

According to various embodiments, the carrier may include dielectric material. According to various embodiments, the carrier may include at least one material of the following group of materials: an oxide, a nitride, or a carbide.

According to various embodiments, the carrier may include dielectric material. According to various embodiments, the carrier may include at least one material of the following group of materials: silicon oxide, silicon nitride ($Si_3N_4$), silicon carbide (SiC), aluminum oxide ($Al_2O_3$), hafnium oxide ($HfO_2$), or zirconium oxide ($ZrO_2$).

According to various embodiments, the carrier may include at least one embedded electrode exposed at a surface of the carrier facing the two-dimensional layer. According to various embodiments, the carrier may include at least one metallization structure or metallization layer disposed in a surface region of the carrier facing the two-dimensional layer.

According to various embodiments, the method for processing the carrier may further include: at least one of deforming or at least partially removing the auxiliary layer structure after removing the support layer (e.g. to bring the two-dimensional layer in physical contact with a surface of the carrier).

According to various embodiments, the auxiliary layer structure may include a polymer, e.g. PMMA. Alternatively, the auxiliary layer structure may include any other suitable material, e.g. a metal, a metal nitride, a metal oxide, etc.

According to various embodiments, forming the auxiliary layer structure may include contacting the exposed portion of the carrier by a portion of the auxiliary layer structure. In other words, the auxiliary layer structure may be in direct physical contact with the carrier.

According to various embodiments, forming or providing the layer structure over the carrier may include: forming the support layer over the carrier; forming the two-dimensional layer over the support layer; and partially removing the two-dimensional layer and the support layer to provide the at least one opening that exposes the portion of the carrier.

According to various embodiments, forming or providing the layer structure over the carrier may include: depositing the support layer over the carrier; depositing the two-dimensional layer over the support layer; and patterning the two-dimensional layer and the support layer to provide the at least one opening that exposes the portion of the carrier.

According to various embodiments, forming the auxiliary layer structure may include: forming a first auxiliary layer; patterning the first auxiliary layer to provide a mask layer for partially removing the two-dimensional layer and the support layer. According to various embodiments, forming the first auxiliary layer may include any type of deposition process, e.g. PVD, CVD, spin coating, dip coating, spray coating, etc.

According to various embodiments, forming or providing the layer structure over the carrier may include: forming the support layer (e.g. a copper layer) partially over the carrier, so that the at least one opening is provided in the support layer that exposes the portion of the carrier; and forming the two-dimensional layer over the support layer. According to various embodiments, forming the support layer may include depositing a metal (e.g. copper) over the carrier and carrying out a heat treatment so that at least one opening (also referred to as one or more holes) is provided in the support layer.

According to various embodiments, forming the auxiliary layer structure may include: forming a single auxiliary layer that covers the two-dimensional layer and fills the at least one opening. According to various embodiments, forming the single auxiliary layer may include any type of deposition process, e.g. PVD, CVD, spin coating, dip coating, spray coating, etc.

According to various embodiments, a method for transferring a two-dimensional (e.g. a graphene layer) that is disposed on a surface of a first layer (e.g. of a support layer) to a surface of a second layer (e.g. of a carrier) may include: forming a transfer layer structure (also referred to as auxiliary layer structure) that at least partially covers the two-dimensional layer and that at least partially covers at least one sidewall of the first layer; bringing the surface of the second layer in physical contact with the transfer layer structure, wherein the first layer is disposed between the second layer and the two-dimensional layer; and, subsequently, removing the first layer; and, subsequently, at least one of deforming or removing the transfer layer structure to bring the two-dimensional layer in physical contact with the surface of the second layer.

According to various embodiments, the two-dimensional layer may include at least one graphene sheet.

According to various embodiments, the first layer may be at least one of an electrically conductive layer or an electrically semi-conductive layer.

According to various embodiments, the second layer may be at least one of a dielectric layer disposed on a wafer or a dielectric wafer.

According to various embodiments, the transfer layer structure may include a transfer material that allows selectively removing the first layer without substantially removing the two-dimensional layer or the carrier.

According to various embodiments, the at least one sidewall of the first layer is at least one of an inner sidewall of at least one opening disposed in the first layer or at least one outer sidewall of the first layer.

According to various embodiments, a method for transferring a graphene layer that is disposed on a surface of a catalytic layer to a surface of a dielectric layer, wherein the dielectric layer is in physical contact with the catalytic layer, may include: forming at least one opening that extends through the graphene layer and through the catalytic layer to the surface of the dielectric layer; forming a transfer layer structure that covers the graphene layer and fills the least one opening, wherein the transfer layer structure is in physical contact with the dielectric layer; and, subsequently, removing the catalytic layer; and, subsequently, at least one of deforming or removing the transfer layer structure to bring the graphene layer in physical contact with the surface of the dielectric layer.

According to various embodiments, the transfer layer structure may at least partially encapsulate the graphene layer.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing a carrier, the method comprising:
   forming a layer structure over the carrier, the layer structure comprising a support layer and a two-dimensional layer over the support layer; wherein the layer structure has at least one opening that exposes a portion of the carrier;
   forming an auxiliary layer structure, wherein the auxiliary layer structure at least partially covers the layer structure and at least partially fills the at least one opening; and
   removing the support layer of the layer structure.

2. The method according to claim 1;
   wherein the two-dimensional layer comprises at least one graphene sheet.

3. The method according to claim 1;
   wherein the support layer is at least one of an electrically conductive support layer or an electrically semi-conductive support layer.

4. The method according to claim 1;
   wherein the support layer has a thickness greater than 0.5 μm.

5. The method according to claim 1;
   wherein the carrier comprises dielectric material.

6. The method according to claim 1;
   wherein the carrier comprises at least one embedded electrode exposed at a surface of the carrier facing the two-dimensional layer.

7. The method according to claim 1, further comprising:
   at least one of deforming or at least partially removing the auxiliary layer structure after removing the support layer.

8. The method according to claim 1;
   wherein the auxiliary layer structure comprises a polymer.

9. The method according to claim 1;
   wherein forming the auxiliary layer structure comprises contacting the exposed portion of the carrier by a portion of the auxiliary layer structure.

10. The method according to claim 1;
    wherein forming the layer structure over the carrier comprises:
    forming the support layer over the carrier;
    forming the two-dimensional layer over the support layer; and
    partially removing the two-dimensional layer and the support layer to provide the at least one opening that exposes the portion of the carrier.

11. The method according to claim 10;
    wherein forming the auxiliary layer structure comprises:
    forming a first auxiliary layer;
    patterning the first auxiliary layer to provide a mask layer for partially removing the two-dimensional layer and the support layer.

12. The method according to claim 1;
    wherein forming the layer structure over the carrier comprises:
    forming the support layer partially over the carrier, so that the at least one opening is provided in the support layer that exposes the portion of the carrier; and
    forming the two-dimensional layer over the support layer.

13. The method according to claim 12;
    wherein forming the auxiliary layer structure comprises:
    forming a single auxiliary layer that covers the two-dimensional layer and fills the at least one opening.

14. A method for transferring a two-dimensional layer that is disposed on a surface of a first layer to a surface of a second layer, the method comprising:
    forming a transfer layer structure that at least partially covers the two-dimensional layer and that at least partially covers at least one sidewall of the first layer;
    bringing the surface of the second layer in physical contact with the transfer layer structure, wherein the first layer is disposed between the second layer and the two-dimensional layer; and, subsequently,
    removing the first layer; and, subsequently,
    at least one of deforming or removing the transfer layer structure to bring the two-dimensional layer in physical contact with the surface of the second layer.

15. The method according to claim 14;
    wherein the two-dimensional layer comprises at least one graphene sheet.

16. The method according to claim 14;
    wherein the first layer is at least one of an electrically conductive layer or an electrically semi-conductive layer.

17. The method according to claim 14;
    wherein the second layer is at least one of a dielectric layer disposed on a wafer or a dielectric wafer.

18. The method according to claim 14;
    wherein the transfer layer structure comprises a transfer material that allows selectively removing the first layer.

19. The method according to claim 14;
    wherein the at least one sidewall of the first layer is at least one of an inner sidewall of at least one opening disposed in the first layer or at least one outer sidewall of the first layer.

20. A method for transferring a graphene layer that is disposed on a surface of a catalytic layer to a surface of a dielectric layer that is in physical contact with the catalytic layer, the method comprising:

forming at least one opening that extends through the graphene layer and through the catalytic layer to the surface of the dielectric layer;

forming a transfer layer structure that covers the graphene layer and fills the least one opening, wherein the transfer layer structure is in physical contact with the dielectric layer; and, subsequently, removing the catalytic layer; and, subsequently, at least one of deforming or removing the transfer layer structure to bring the graphene layer in physical contact with the surface of the dielectric layer.

\* \* \* \* \*